(12) United States Patent
Thieman

(10) Patent No.: US 9,075,290 B1
(45) Date of Patent: Jul. 7, 2015

(54) MOUNTING BRACKET FOR SURVEILLANCE CAMERAS

(71) Applicant: Michael Thieman, Orlando, FL (US)

(72) Inventor: Michael Thieman, Orlando, FL (US)

( * ) Notice: Subject to any disclaimer, the term of this patent is extended or adjusted under 35 U.S.C. 154(b) by 0 days.

(21) Appl. No.: 14/523,034

(22) Filed: Oct. 24, 2014

Related U.S. Application Data

(60) Provisional application No. 61/982,982, filed on Apr. 23, 2014.

(51) Int. Cl.
  *G03B 17/56* (2006.01)
  *B60R 11/04* (2006.01)
  *B60R 11/00* (2006.01)

(52) U.S. Cl.
  CPC .............. *G03B 17/561* (2013.01); *B60R 11/04* (2013.01); *B60R 2011/0049* (2013.01)

(58) Field of Classification Search
  CPC ................. G03B 17/561; B60R 11/04; B60R 2011/0049
  See application file for complete search history.

(56) References Cited

U.S. PATENT DOCUMENTS

| | | | |
|---|---|---|---|
| 1,876,478 A | 9/1932 | Duzer | |
| 2,614,471 A | 10/1952 | Markowitz | |
| 2,920,853 A | 1/1960 | Bufogle | |
| 2,986,627 A | 5/1961 | Marriett | |
| 3,964,612 A | 6/1976 | Skilliter | |
| 4,138,019 A | 2/1979 | Smith | |
| 4,141,524 A | 2/1979 | Corvese | |
| 4,301,767 A | 11/1981 | Willinger | |
| 4,771,300 A | 9/1988 | Bryan | |
| D302,697 S | 8/1989 | Parrish | |
| 5,073,998 A | 12/1991 | Wood | |
| 5,260,731 A * | 11/1993 | Baker, Jr. | 396/428 |
| 5,368,267 A | 11/1994 | Howard | |
| 5,620,059 A | 4/1997 | Crispeno | |
| 5,822,918 A | 10/1998 | Helfman | |
| 5,835,808 A * | 11/1998 | Parker et al. | 396/419 |
| 6,019,326 A | 2/2000 | Baerwolf | |
| 6,854,785 B2 * | 2/2005 | Simon et al. | 296/146.7 |
| 6,991,384 B1 | 1/2006 | Davis | |
| 8,678,680 B1 * | 3/2014 | Pelini | 396/428 |
| 2003/0057749 A1 * | 3/2003 | Buono | 297/217.3 |
| 2011/0129210 A1 * | 6/2011 | McGucken | 396/422 |

* cited by examiner

*Primary Examiner* — WB Perkey
(74) *Attorney, Agent, or Firm* — Brian S. Steinberger; Law Offices of Brian S. Steinberger, P.A.

(57) ABSTRACT

Universal L shaped brackets, supports, apparatus, systems and methods for mounting surveillance cameras that form enclosure systems, mounting systems, and pedestal system for the cameras to be mounted on structures, such as but not limited to under a ceiling, a shelf, a wall, inside a pedestal and the like. Another embodiment covers brackets, supports, apparatus, systems and methods for mounting surveillance cameras with a universal mount for inside of vehicles, such as automobiles, and the like. The mounts can include mounting cameras on the backs of seats or door edges. The mounts can mount the cameras inside of pedestals.

20 Claims, 27 Drawing Sheets

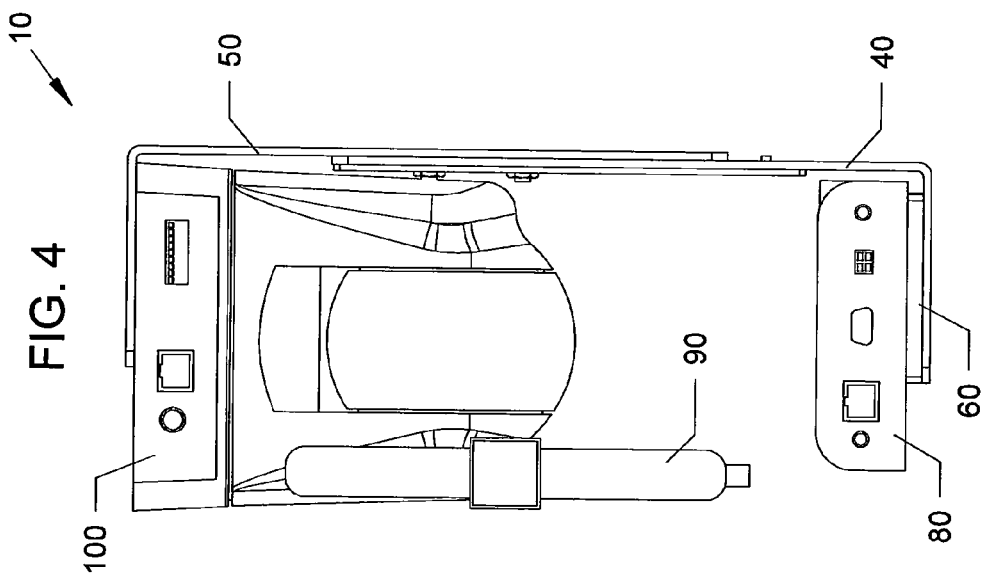
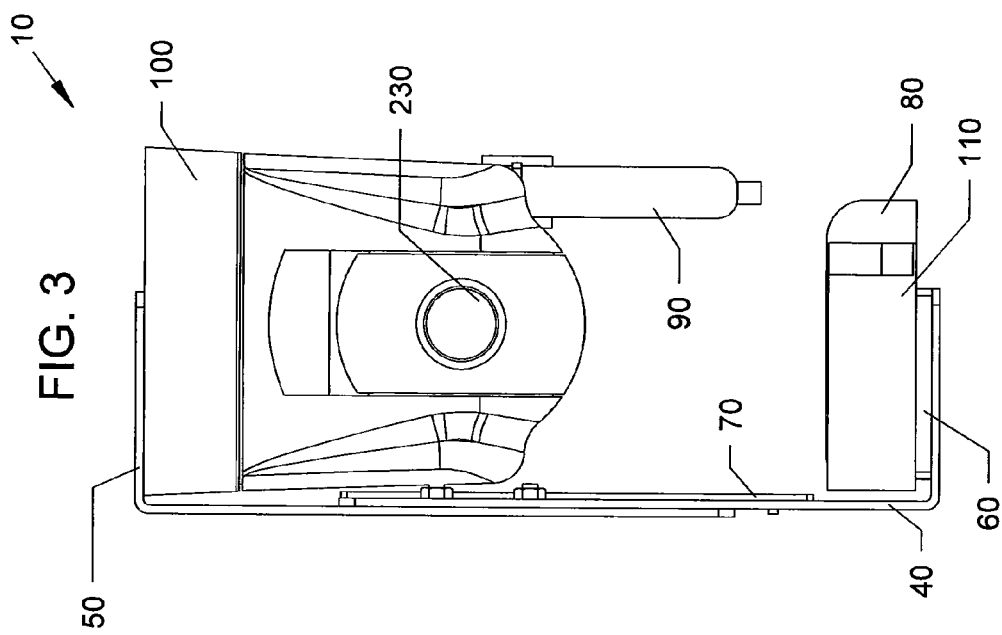

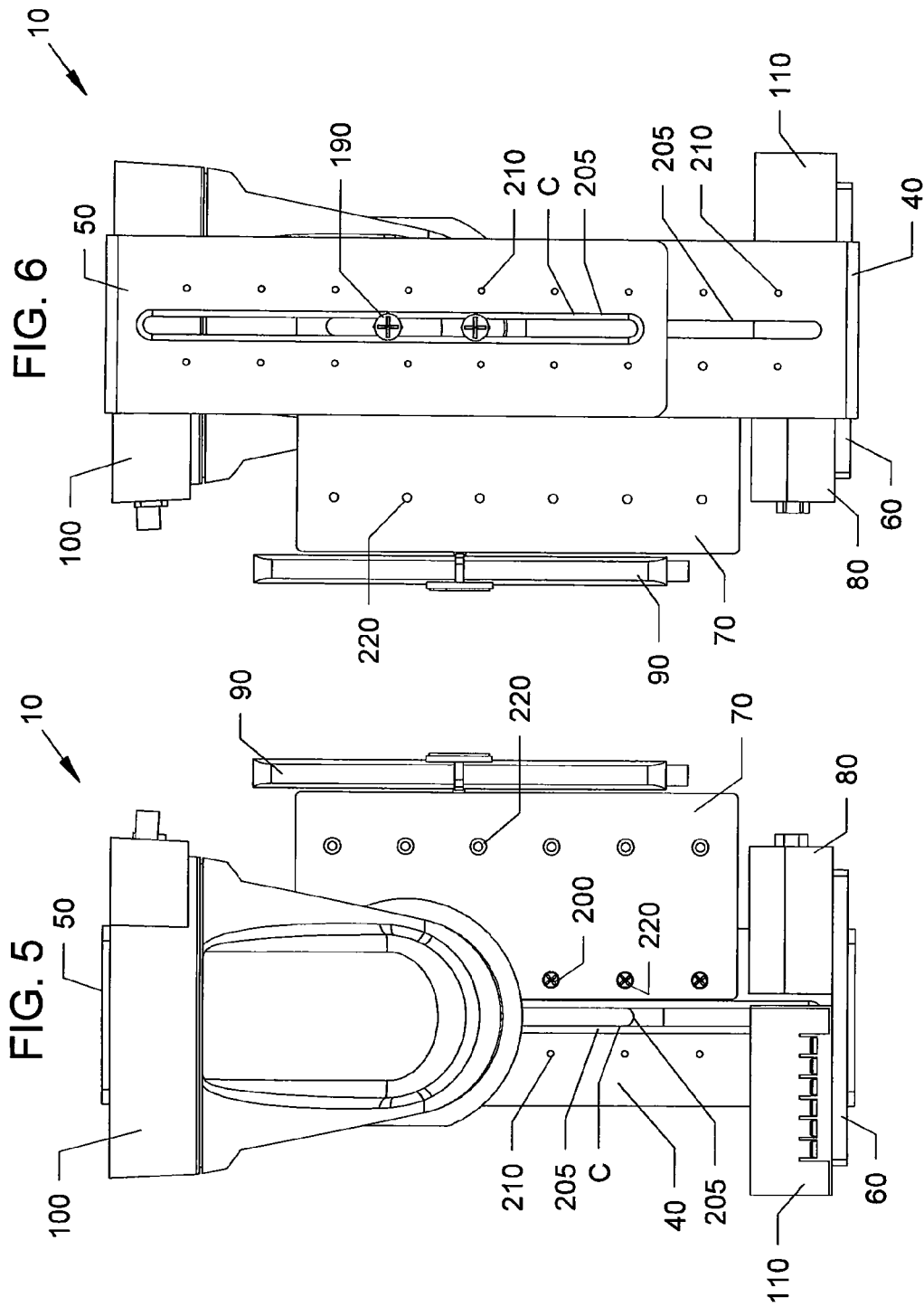

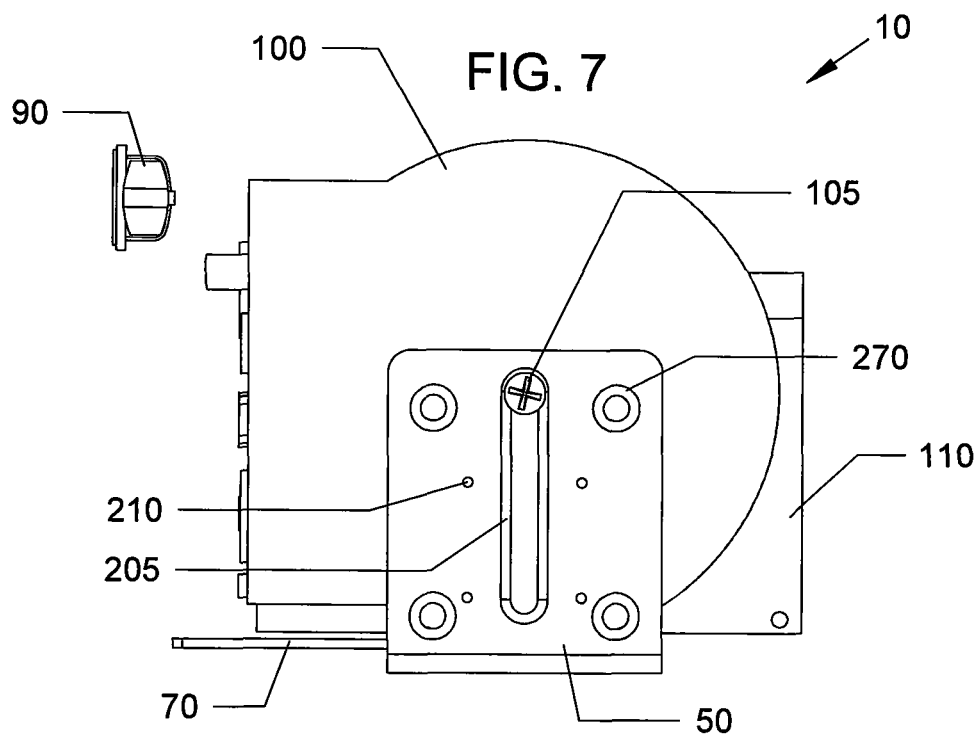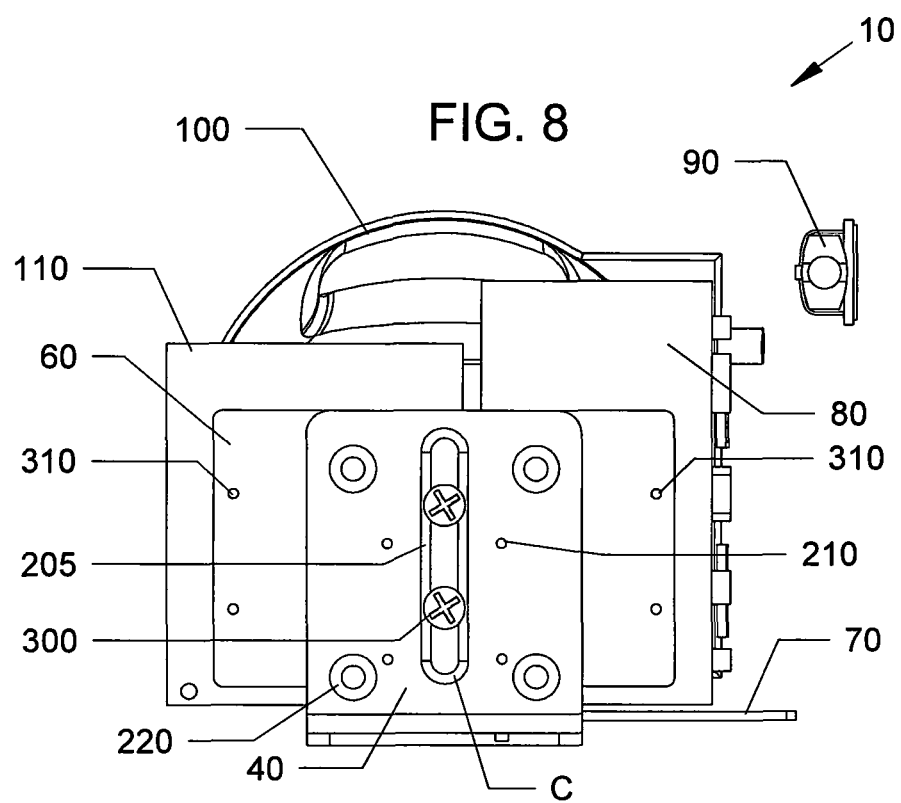

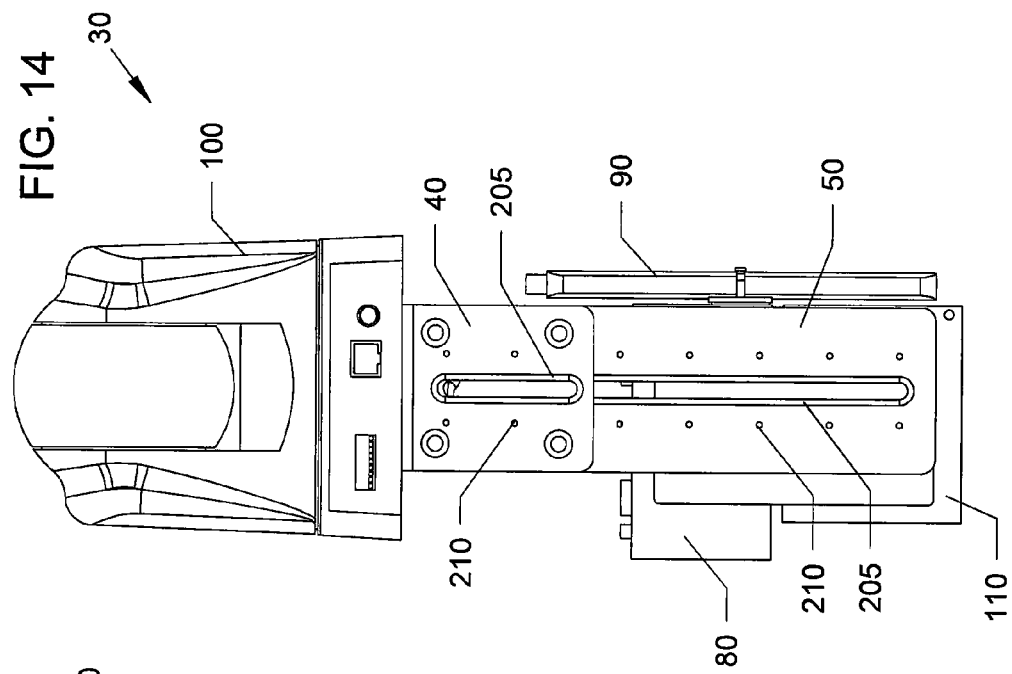
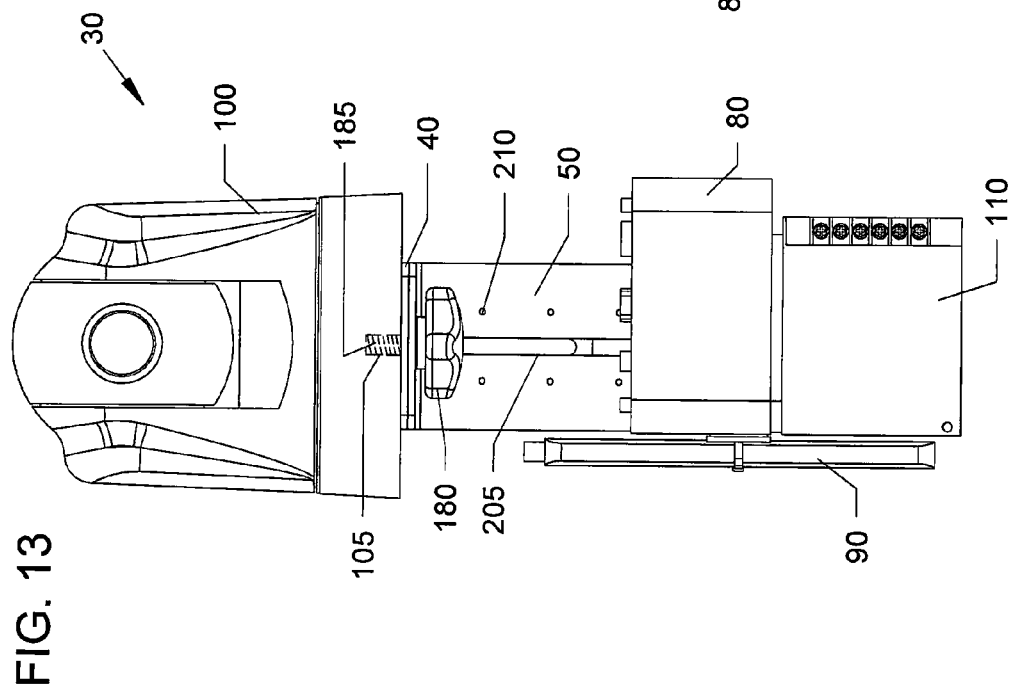

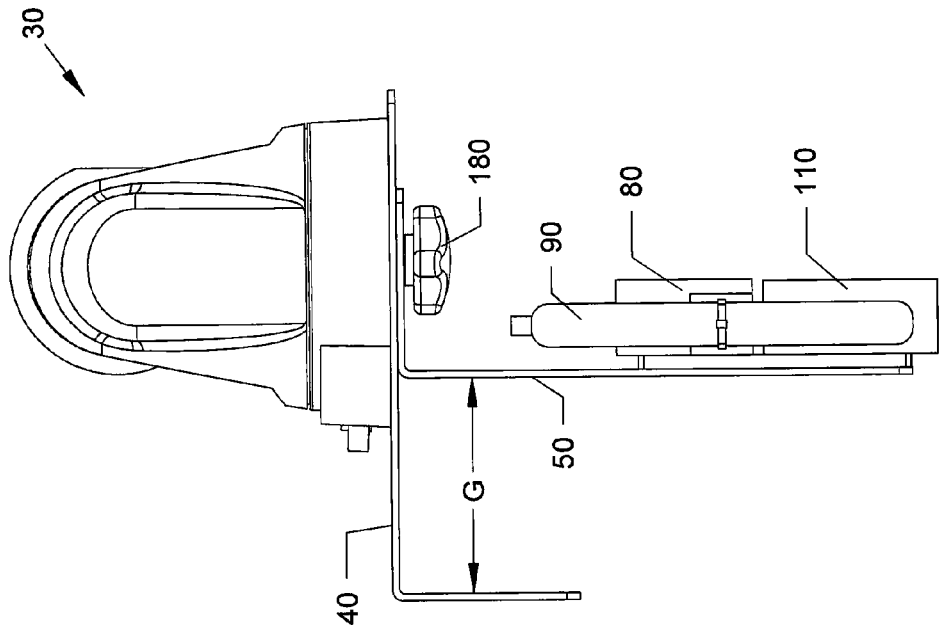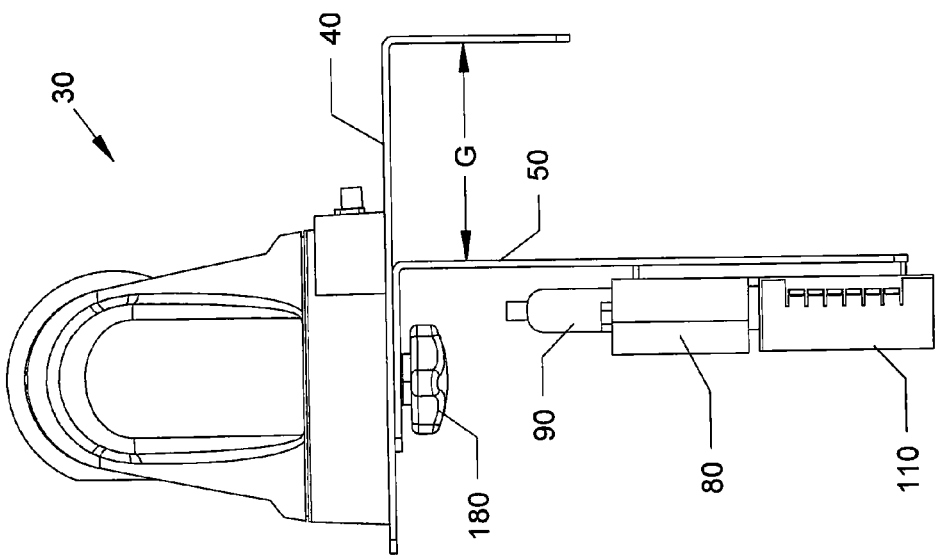

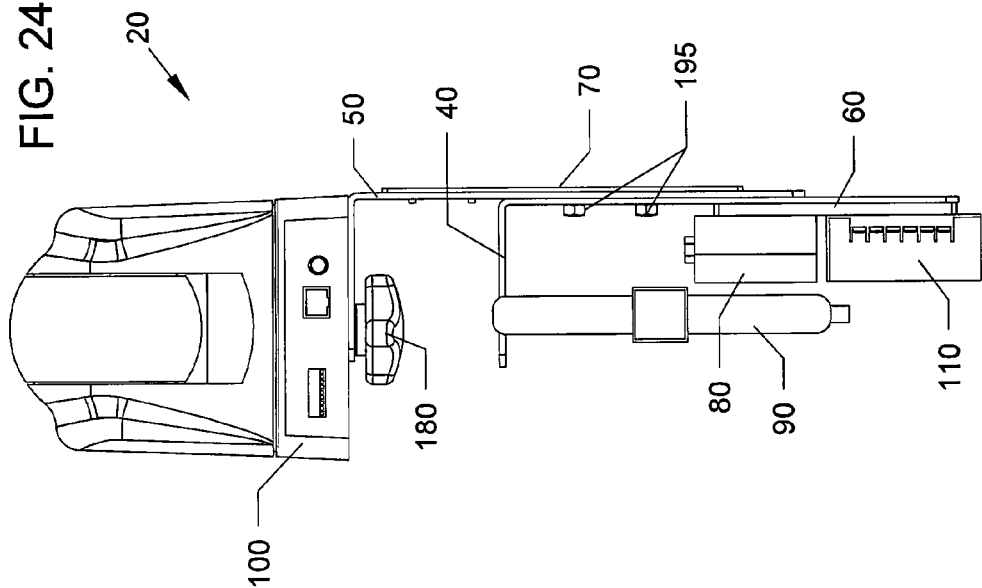
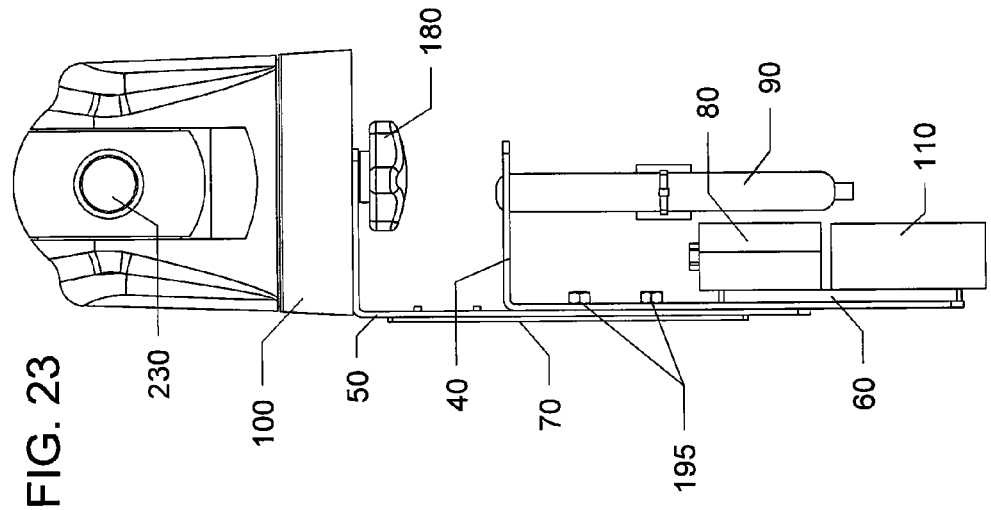

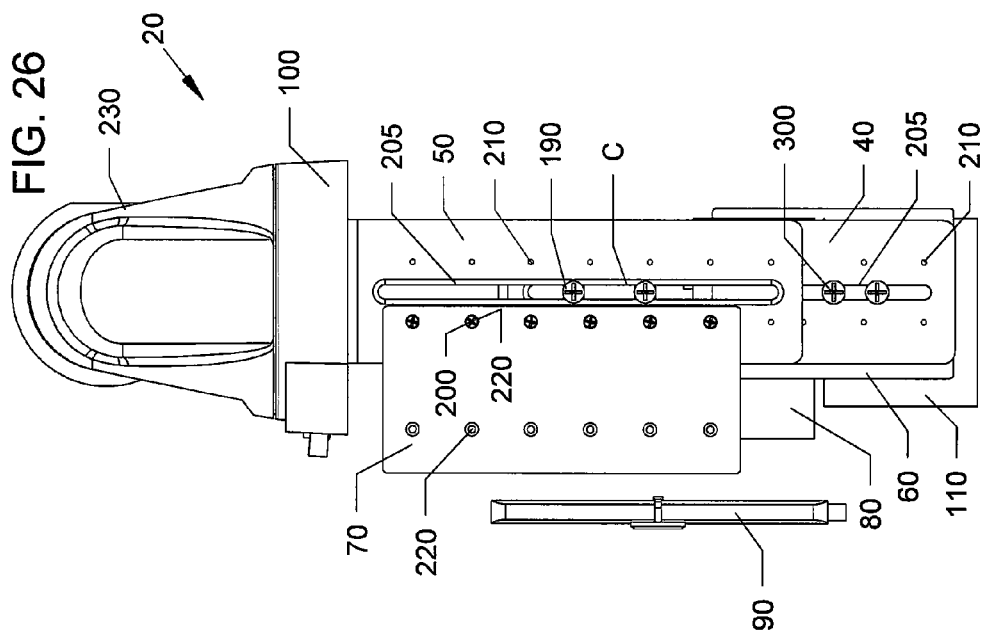
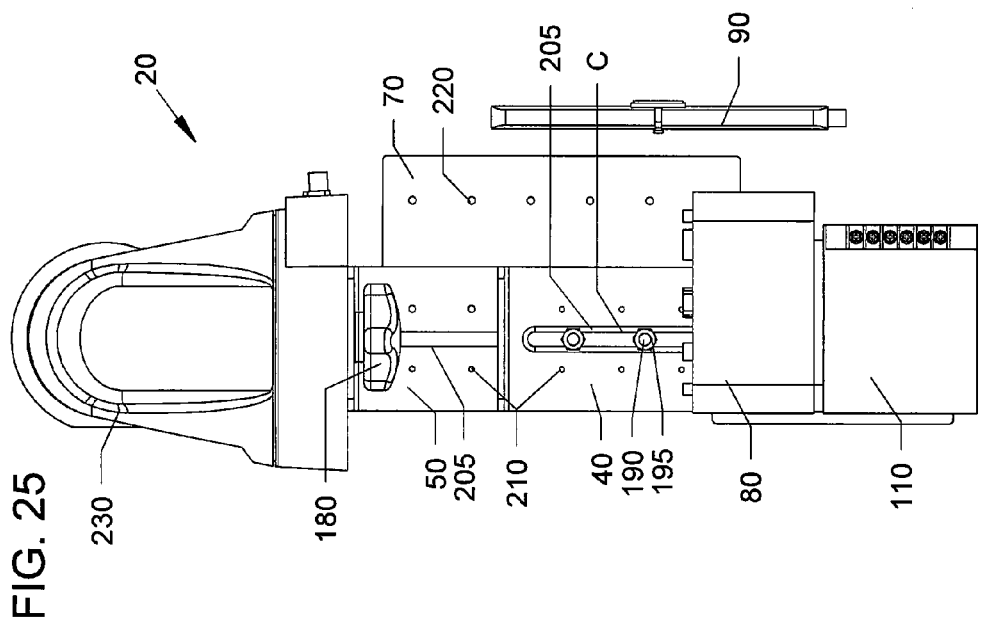

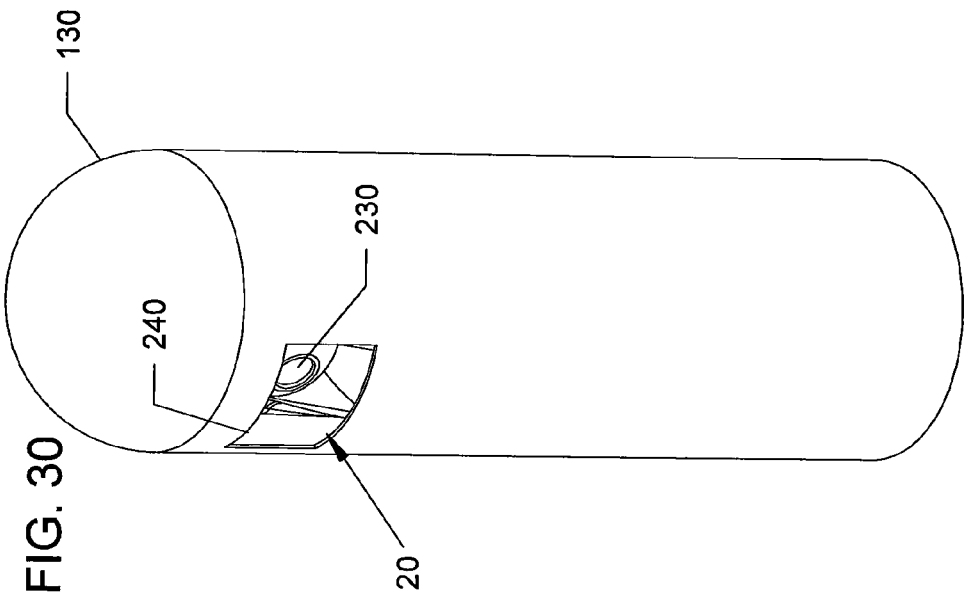
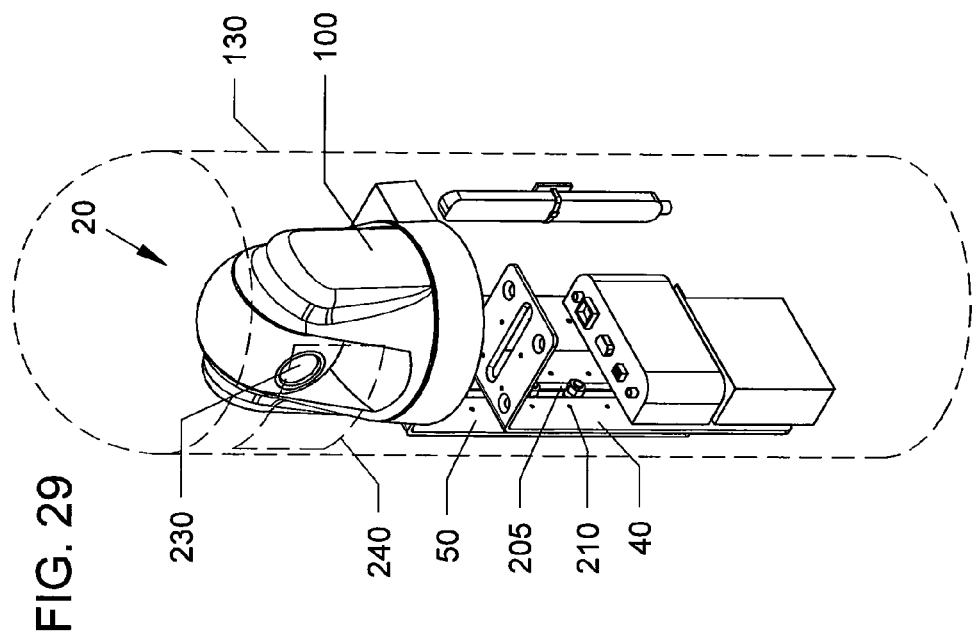

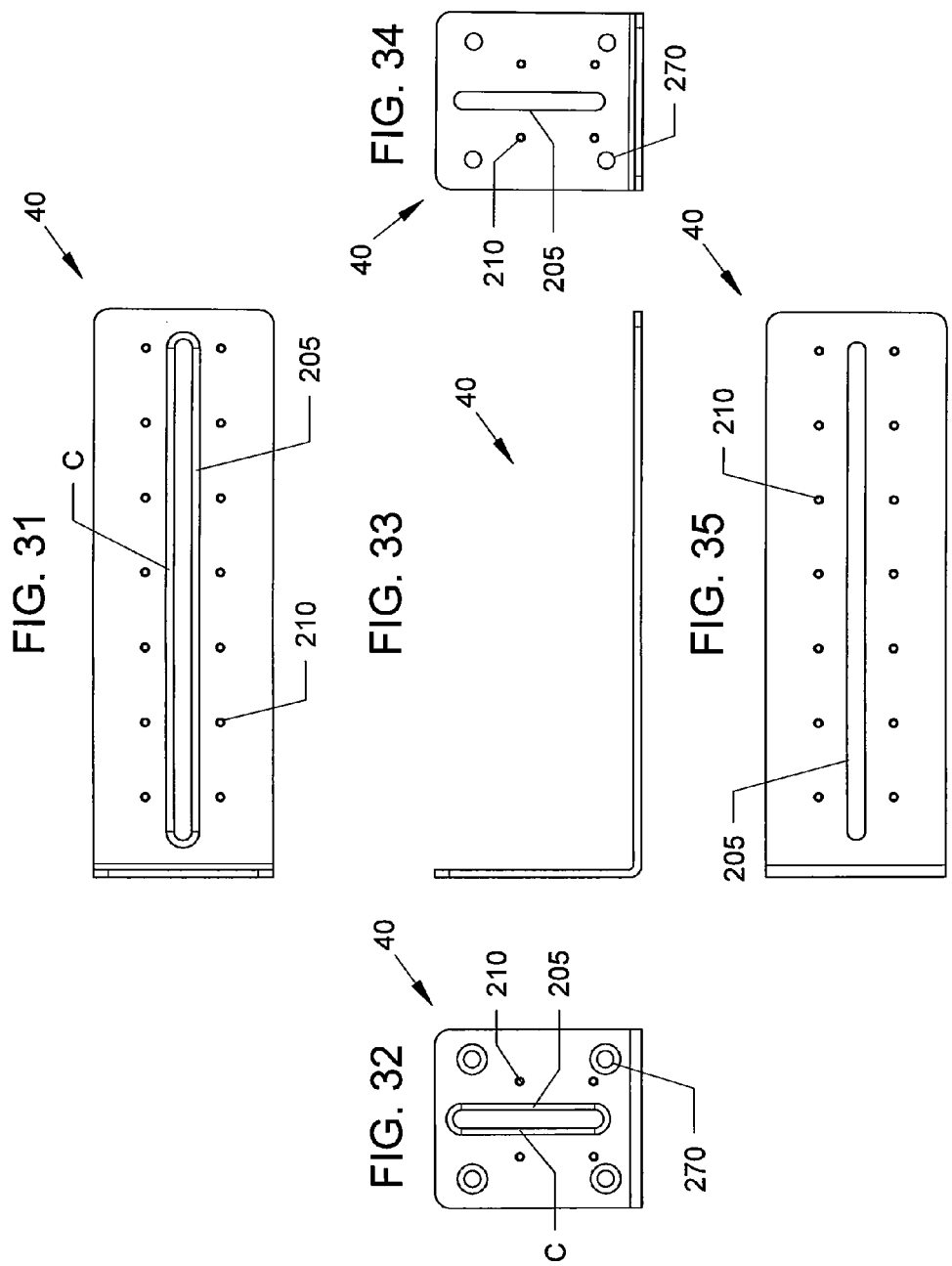

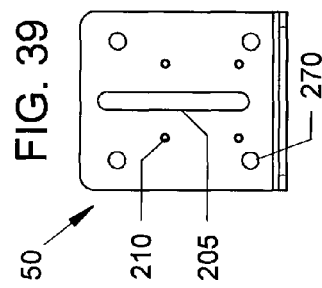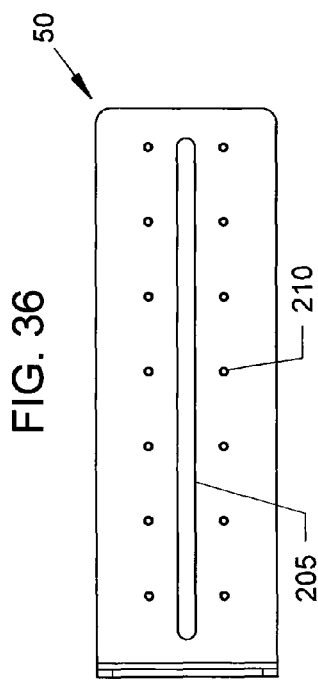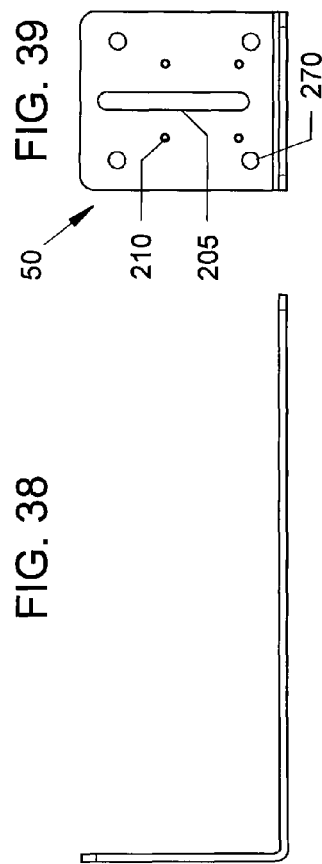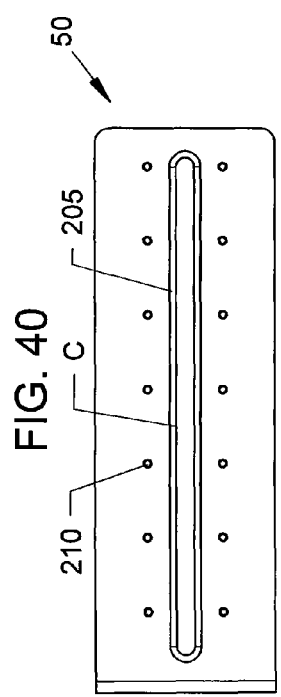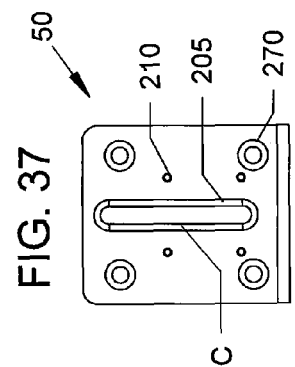

MOUNTING BRACKET FOR SURVEILLANCE CAMERAS

This application claims the benefit of priority to U.S. Provisional Patent Application Ser. No. 61/982,982 filed Apr. 23, 2014, The entire disclosure of which is incorporated by reference in its' entirety.

FIELD OF INVENTION

This invention relates to surveillance cameras, and in particular brackets, supports, apparatus, systems and methods for mounting surveillance cameras with a universal mount on structures, such as but not limited to under a ceiling, a shelf, a wall, on seats and door edges in vehicles, and inside of pedestals.

BACKGROUND AND PRIOR ART

Surveillance cameras have become more and more popular over the years, and are generally needed to be mounted in different locations.

A problem with the cameras is not having a universal mount that allows for the surveillance cameras to be mounted in multiple locations with the one bracket. Typically different types of mounting apparatus must be separately purchased and assembled to mount camera surveillance systems.

Prior mounting brackets were designed to mount the surveillance cameras independent of the cameras associated electronic equipment. This creates a need for larger mounting space.

The ability to easily adapt the mounting system to the required size and shape of the cameras enclosure was difficult.

Installation and removal of the camera system was difficult when not installed on a uni-bracket system.

Thus, the need exists for solutions to the above problems with the prior art.

SUMMARY OF THE INVENTION

A primary objective of the present invention is to provide brackets, supports, apparatus, systems and methods for mounting surveillance cameras with a universal bracket that form enclosures on structures, such as but not limited to under ceiling, a shelf, a wall, and the like.

A secondary objective of the present invention is to provide brackets, supports, apparatus, systems and methods for mounting surveillance cameras with a universal bracket in vehicles, such as automobiles, such as on the tops of seat backings and/or on edges of doors.

A third objective of the present invention is to provide brackets, supports, apparatus, systems and methods for mounting surveillance cameras with a universal bracket inside of pedestals.

The bracket system provides a means to install the camera and associated equipment on a uni-system. This provides the ability to configure and adapt the shape and size to conform to the enclosure. Installation of the camera and associated electronic equipment on a uni-bracket system allows for easier installation into the enclosure or mounting surface.

An embodiment of the camera bracket mounting system can include a first L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, a second L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, a first fastener for mounting sandwiched portions of the first L shaped bracket to the second L shaped bracket by fastening the first fastener through adjacent longitudinal through-hole slots of the first L shaped bracket and the second L shaped bracket, and a second fastener adapted for attaching a surveillance camera to at least one of the first L shaped bracket and the second L shaped bracket.

The first flat plate of the first L shaped bracket and the first flat plate of the second L shaped bracket can overlap one another so that the longitudinal through-hole slot in the first flat plate of the first L shaped bracket and the first flat plate of the second L shaped bracket overlap one another and are attached to one another by the first fastener, and form an enclosure so that the camera is mounted by the second fastener to one of the second flat plates, and the camera is located between the respective perpendicular second flat plates of the first and the second L shaped brackets.

The camera bracket mounting system can include a modem and power supply mount plate adapted for mounting at least one of a camera modem and a camera power supply to the bracket mounting system.

The camera bracket mounting system can include a cable plate attached to at least one of the first L shaped bracket and the second L shaped bracket.

The camera bracket mounting system can include a knob with threaded shaft as the first fastener adapted for passing through the longitudinal through-hole slot of the second plate of the first L shaped bracket, and through the longitudinal through-hole slot of the first plate of the second L shaped bracket.

The first plate of the first L shaped bracket can be oriented in a horizontal direction with the second plate of the first L shaped bracketed oriented downward, and the second plate of the second L shaped bracket is oriented in a horizontal direction parallel to and adjacent to the first plate of the L shaped bracket, and attached to one another by the first fastener.

The first L shaped bracket and the second L shaped bracket can be adapted to be mounted to a vehicle door panel adjacent to a vehicle window.

The first L shaped bracket and the second L shaped bracket can be adapted to be mounted to an upper edge of a vehicle seat.

The first plate of the first L shaped bracket can be oriented in a vertical direction with the second plate of the first L shaped bracketed oriented in a horizontal direction, and the first plate of the second L shaped bracket is oriented in a vertical direction with the second plate of the second L shaped bracket oriented in a horizontal direction, and the first plate of the first L shaped bracket attached to the first plate of the second L shaped bracket by the first fastener, with the second plate of the first L shaped bracket and the second plate of the second L shaped bracket parallel to one another, adapted for the camera to be mounted to one of the second plates of the first L shaped bracket and the second L shaped bracket.

The camera bracket mounting system can include a modem and power supply mounting plate adapted for mounting a modem and power supply through the longitudinal through-hole of at least one of the first plate of the first L shaped bracket or the first plate of the second L shaped bracket.

The camera bracket mounting system can include a knob with threaded shaft as the first fastener adapted for passing through the longitudinal through-hole slot of one of the second plates of the first L shaped bracket and the second L shaped bracket.

The camera bracket mounting system can include a third fastener for attaching at least to one of the first plates of the first L shaped bracket and the second L shaped bracket adapted for mounting the bracket mounting system to a pedestal.

A surveillance camera bracket mounting kit, can include a first L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, a second L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, a first fastener for mounting sandwiched portions of the first L shaped bracket to the second L shaped bracket by fastening the first fastener through adjacent longitudinal through-hole slots of the first L shaped bracket and the second L shaped bracket, a surveillance camera, and a second fastener adapted for attaching the surveillance camera to at least one of the first L shaped bracket and the second L shaped bracket.

The kit can include a box for holding the first L shaped bracket, the second L shaped bracket, the first fastener, the second fastener and the surveillance camera.

The kit can further include a modem and power supply mount plate adapted for mounting at least one of a camera modem and a camera power supply to at least one of the first L shaped bracket and the second L shaped bracket.

The kit can further include a cable plate adapted to be attached to at least one of the first L shaped bracket and the second L shaped bracket.

The kit can further include a knob with threaded shaft as the first fastener adapted for passing through the longitudinal through-hole slot of the second plate of the first L shaped bracket, and through the longitudinal through-hole slot of the first plate of the second L shaped bracket.

A method of mounting surveillance camera with universally attachable brackets, can include the steps of providing a first L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, providing a second L shaped bracket having a first flat plate with a first end and a second end and a longitudinal through-hole slot in the first plate between the first end and the second end, and a second flat plate with a first end and a second end, the first end of the second flat plate extending perpendicular from the second end of the first plate, with a longitudinal through-hole slot between the first end and the second end of the second flat plate, the second flat plate being shorter in length than the first flat plate, providing a first fastener, attaching sandwiched portions of the first L shaped bracket to the second L shaped bracket together into a plurality of different configurations, by fastening the first fastener through adjacent longitudinal through-hole slots of the first L shaped bracket and the second L shaped bracket, providing a second fastener, and attaching a surveillance camera to at least one of the first L shaped bracket and the second L shaped bracket by the second fastener.

Further objects and advantages of this invention will be apparent from the following detailed description of the presently preferred embodiments which are illustrated schematically in the accompanying drawings.

BRIEF DESCRIPTION OF THE FIGURES

First Embodiment

FIG. 3 is a front view of the camera with assembled bracket of FIG. 1.

FIG. 4 is a rear view of the camera with assembled bracket of FIG. 1.

FIG. 5 is a right side view of the camera with assembled bracket of FIG. 1.

FIG. 6 is a left side view of the camera with assembled bracket of FIG. 1.

FIG. 7 is a top view of the camera with assembled bracket of FIG. 1.

FIG. 8 is a bottom view of the camera with assembled bracket of FIG. 1.

Second Embodiment

Figure 11:
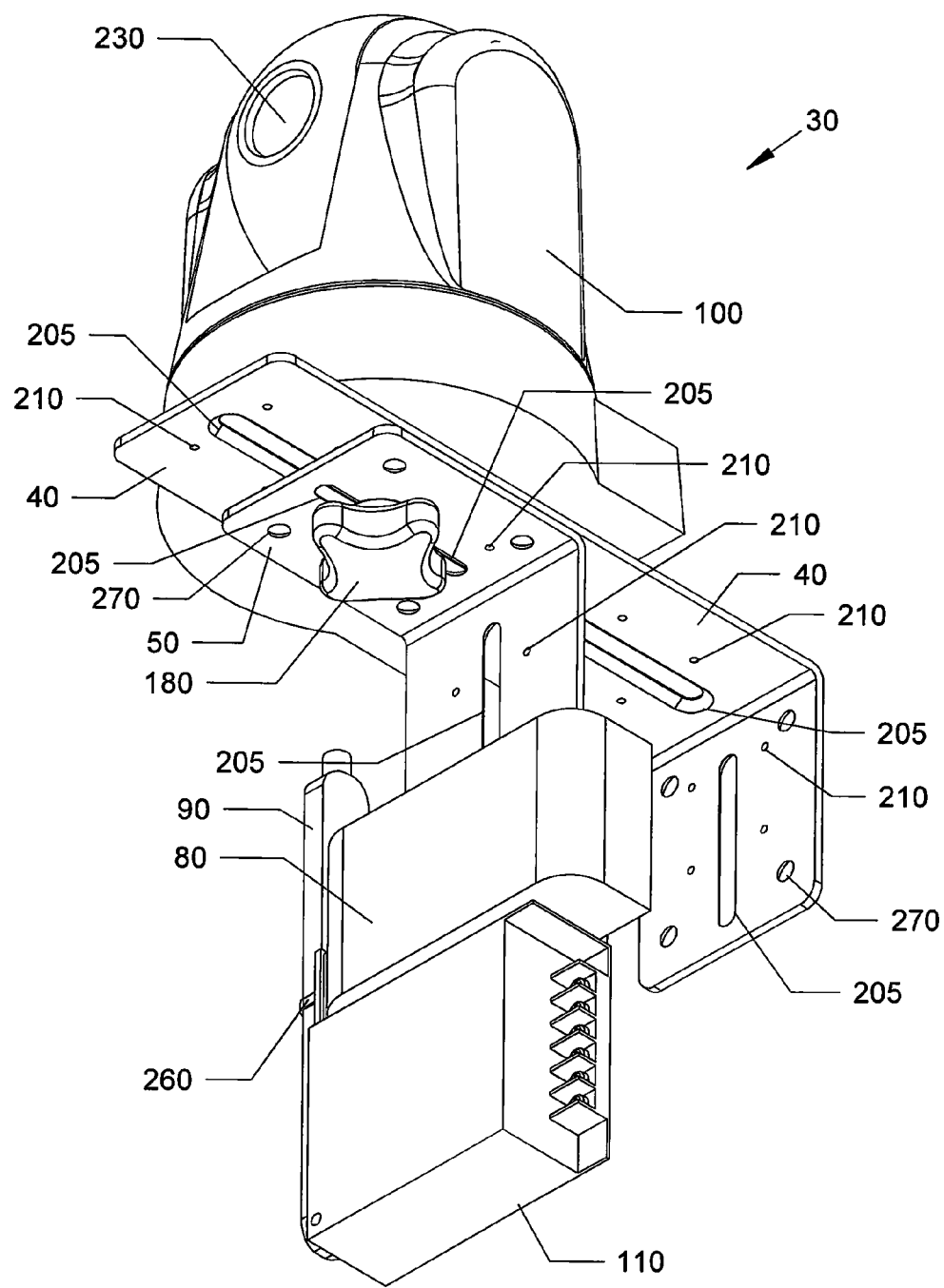

FIG. 11 is a lower front right perspective view of the vehicle mounting bracket for a surveillance camera.

Figure 12A:
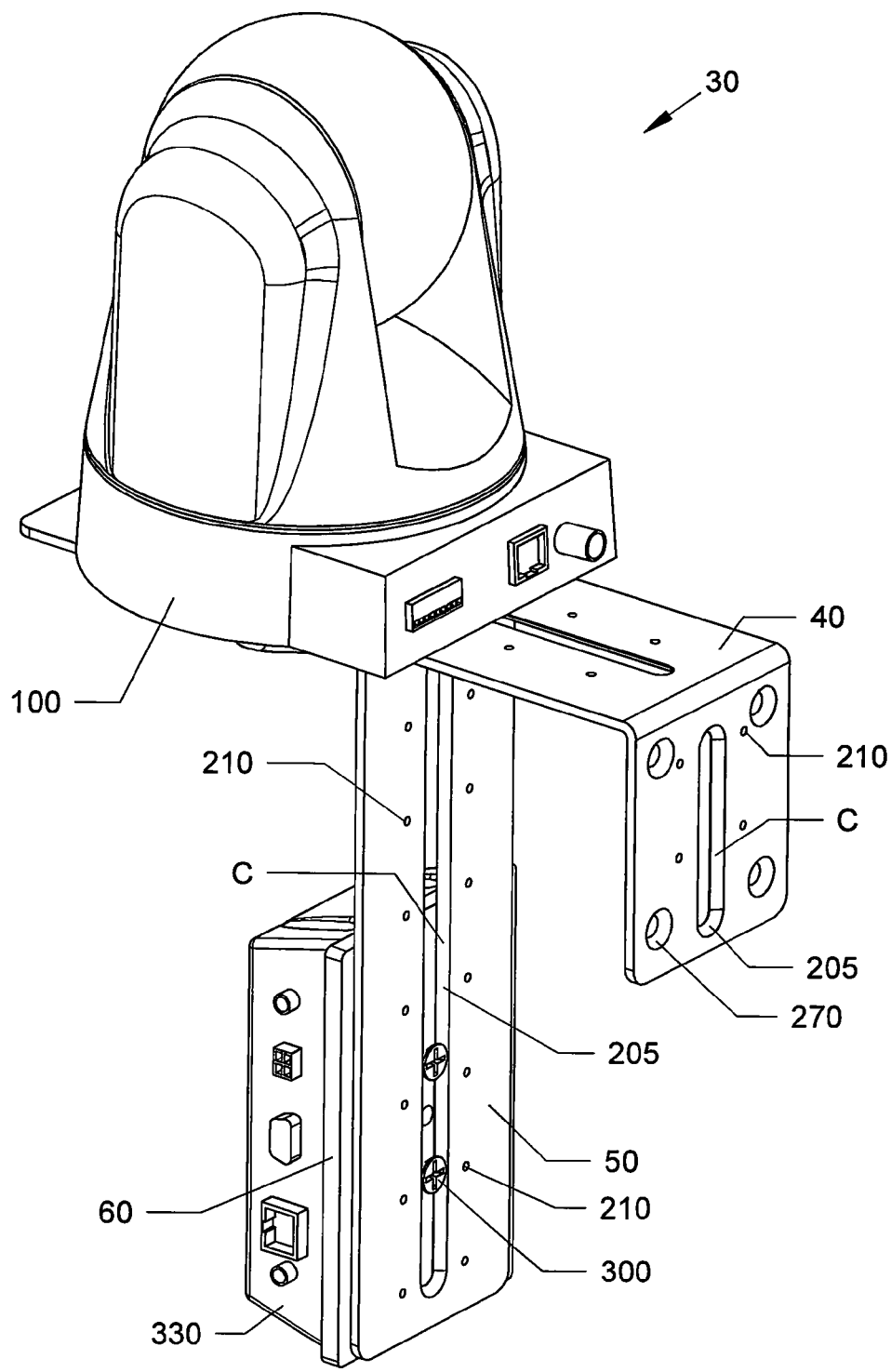
Figure 12B:
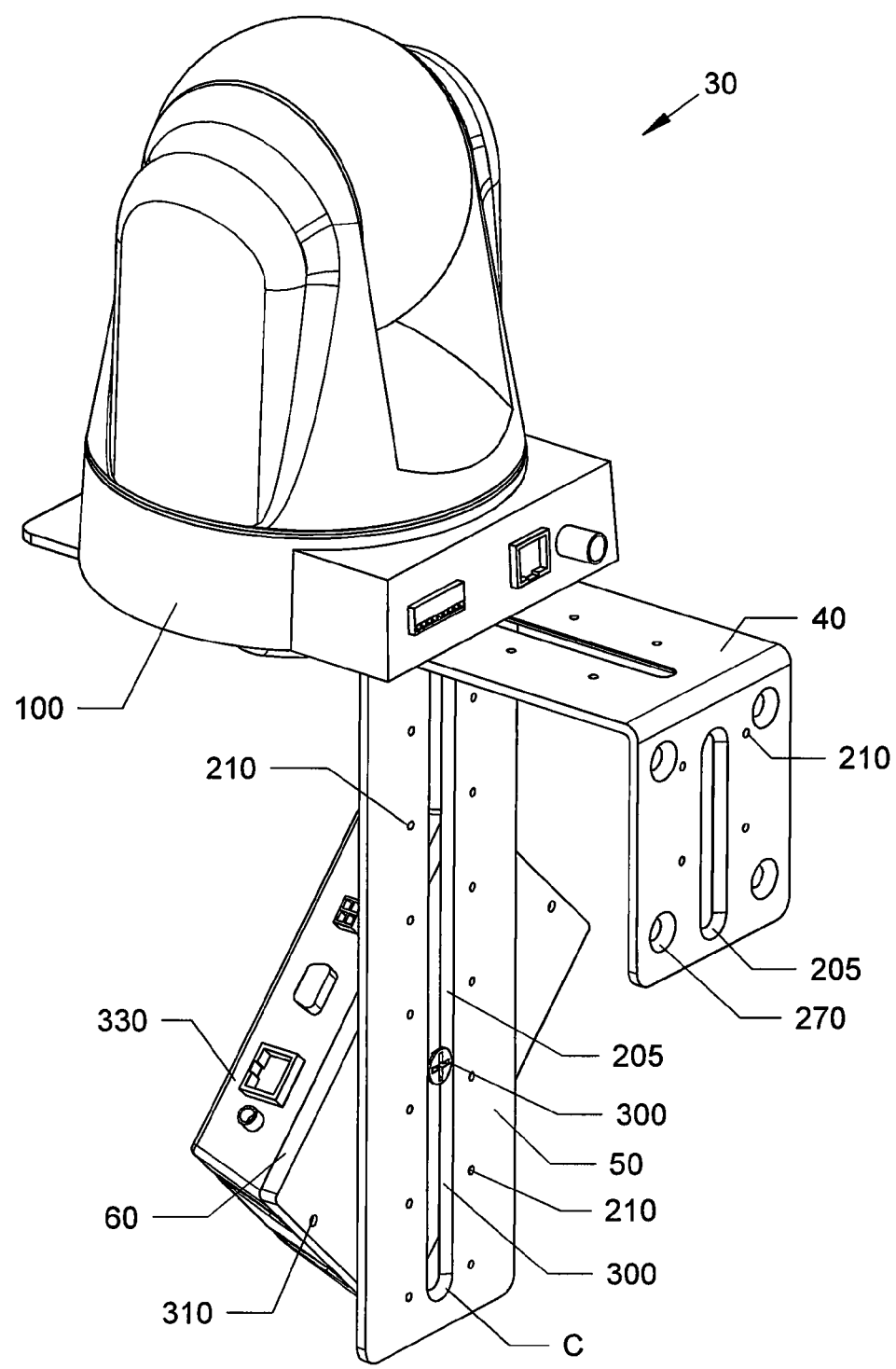
Figure 12C:
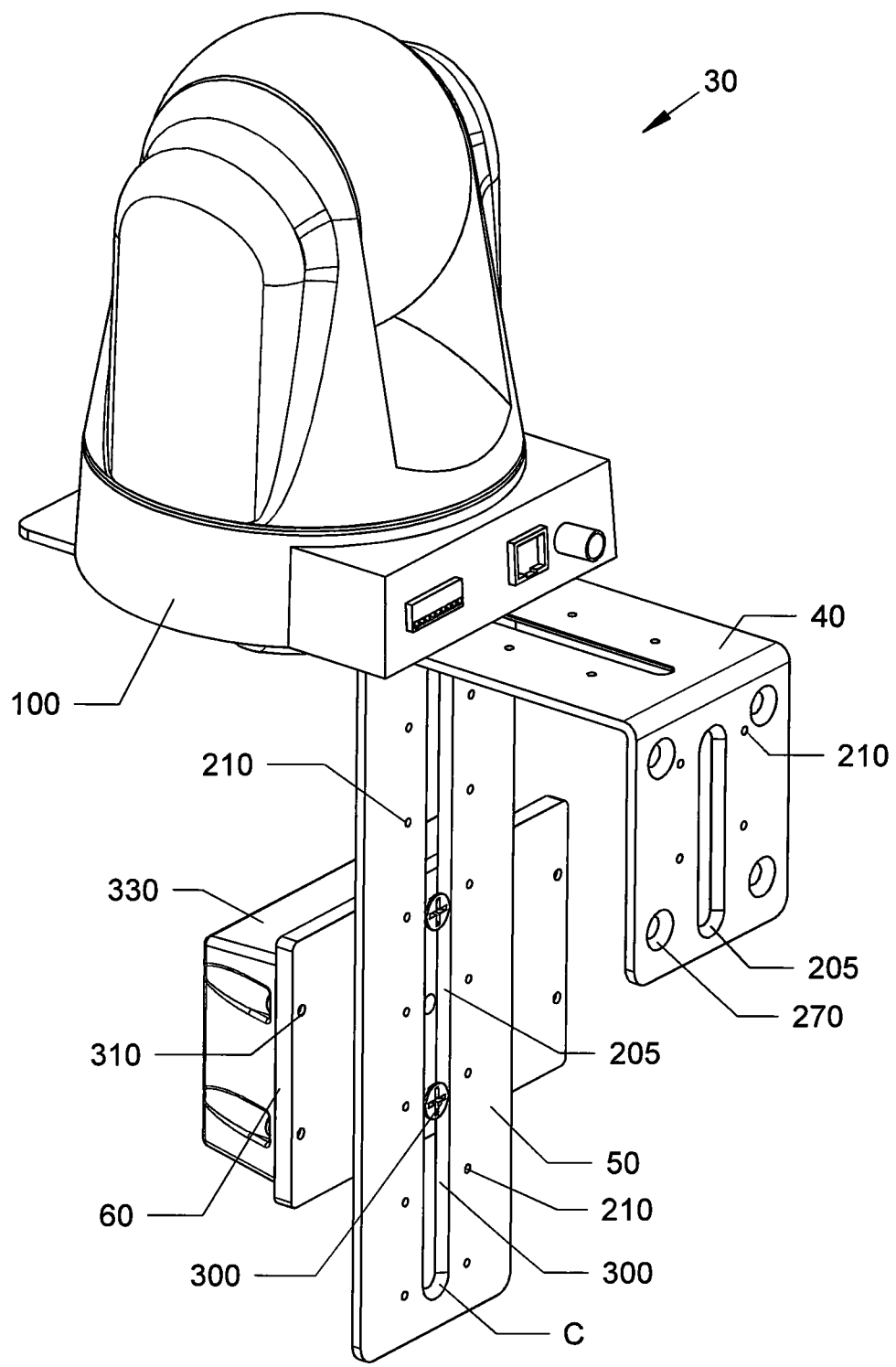

FIGS. 12A, 12B, and 12C are upper rear left perspective views of the vehicle mounting bracket for a surveillance camera of FIG. 11.

Figure 12D:
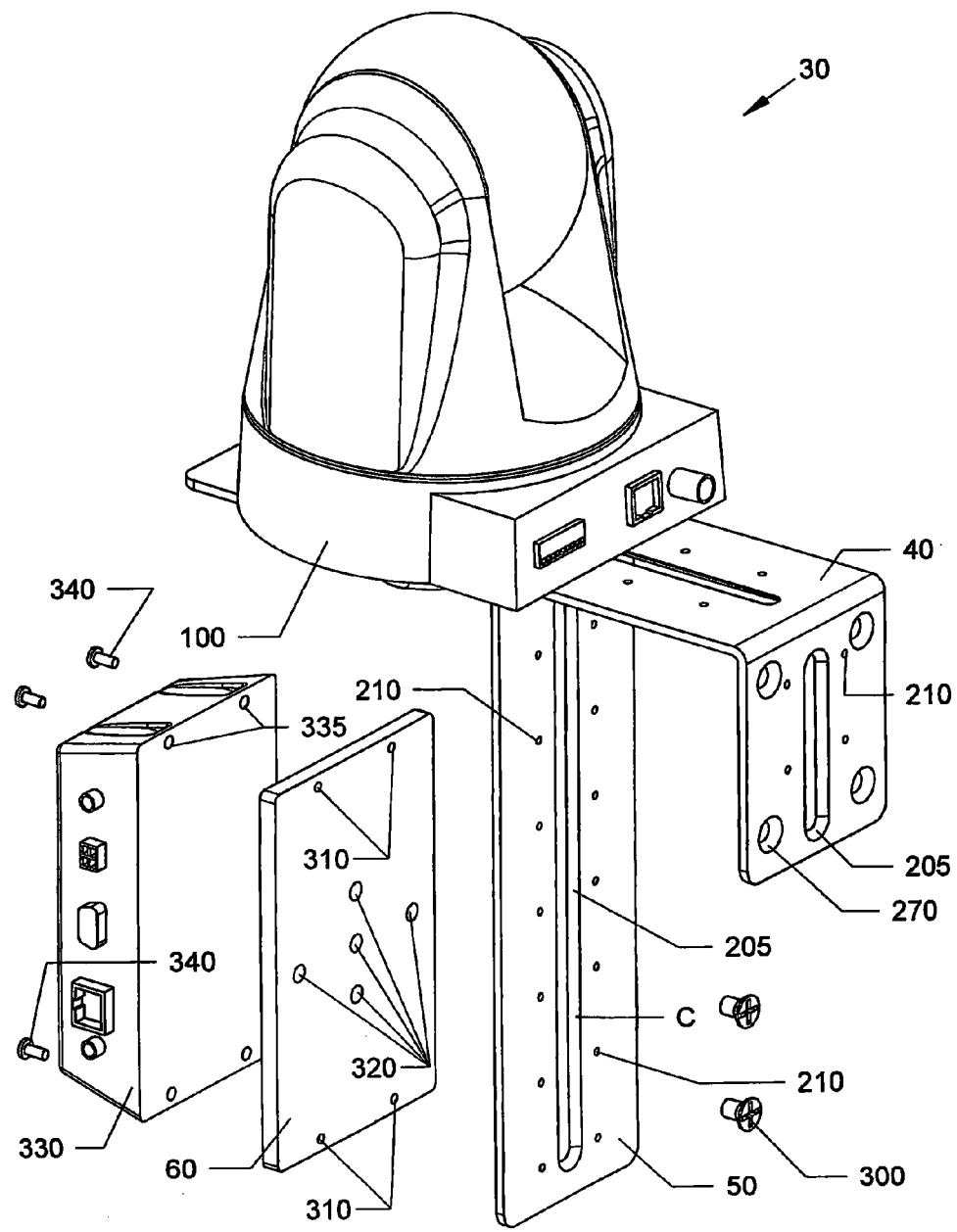

FIG. 12D is an exploded view of the mounting bracket of FIGS. 12A-12C.

FIG. 13 is a front view of the vehicle mounting bracket for a camera of FIG. 11.

FIG. 14 is a rear view of the vehicle mounting bracket for a camera of FIG. 11.

FIG. 15 is a right side view of the mounting bracket for a camera of FIG. 11.

FIG. 16 is a left side view of the mounting bracket for a camera of FIG. 11.

Figure 17:
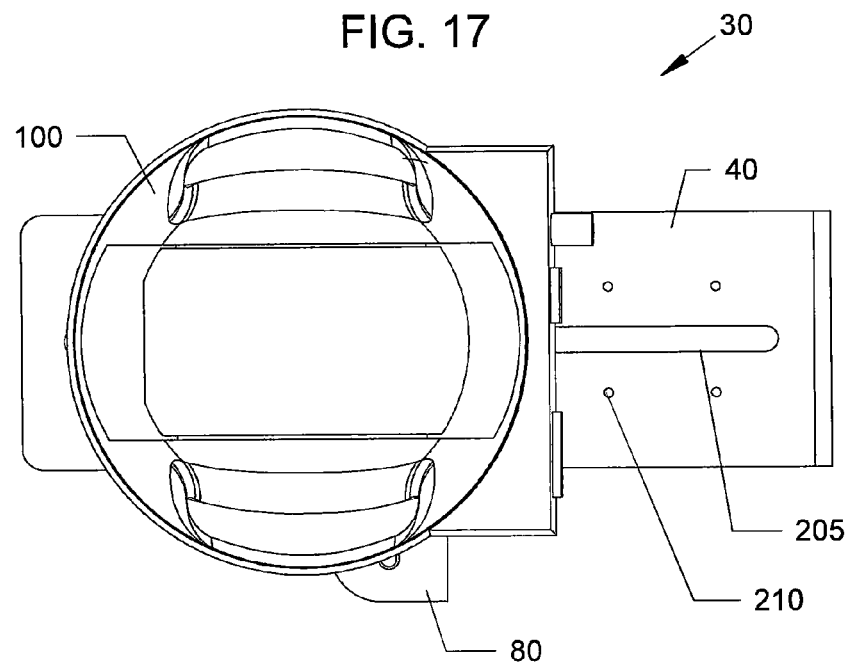

FIG. 17 is a top view of the vehicle mounting bracket for a camera of FIG. 11.

Figure 18:
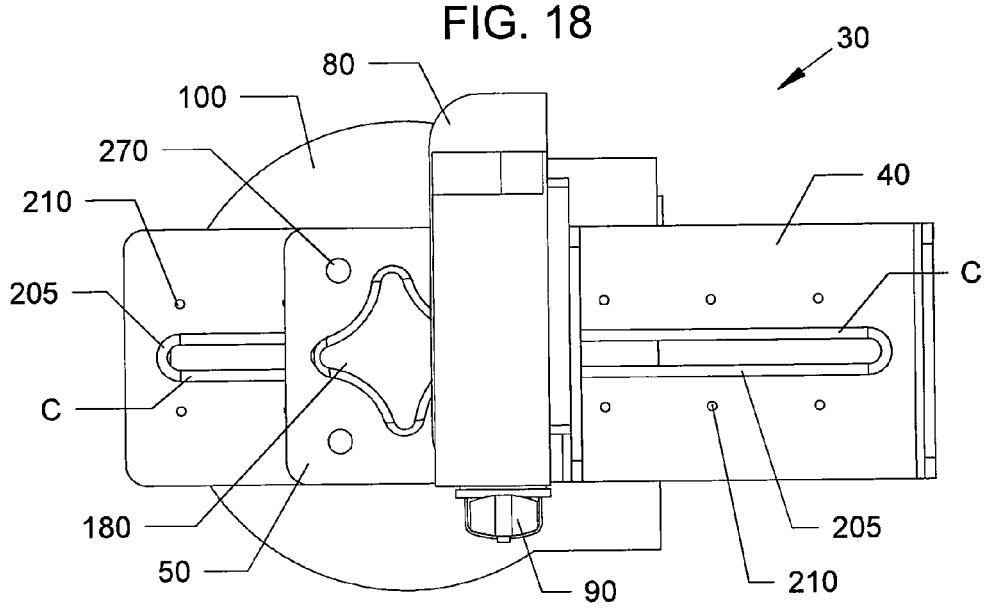

FIG. 18 is a bottom view of the vehicle mounting bracket for a camera of FIG. 11.

Third Embodiment

Figure 19:
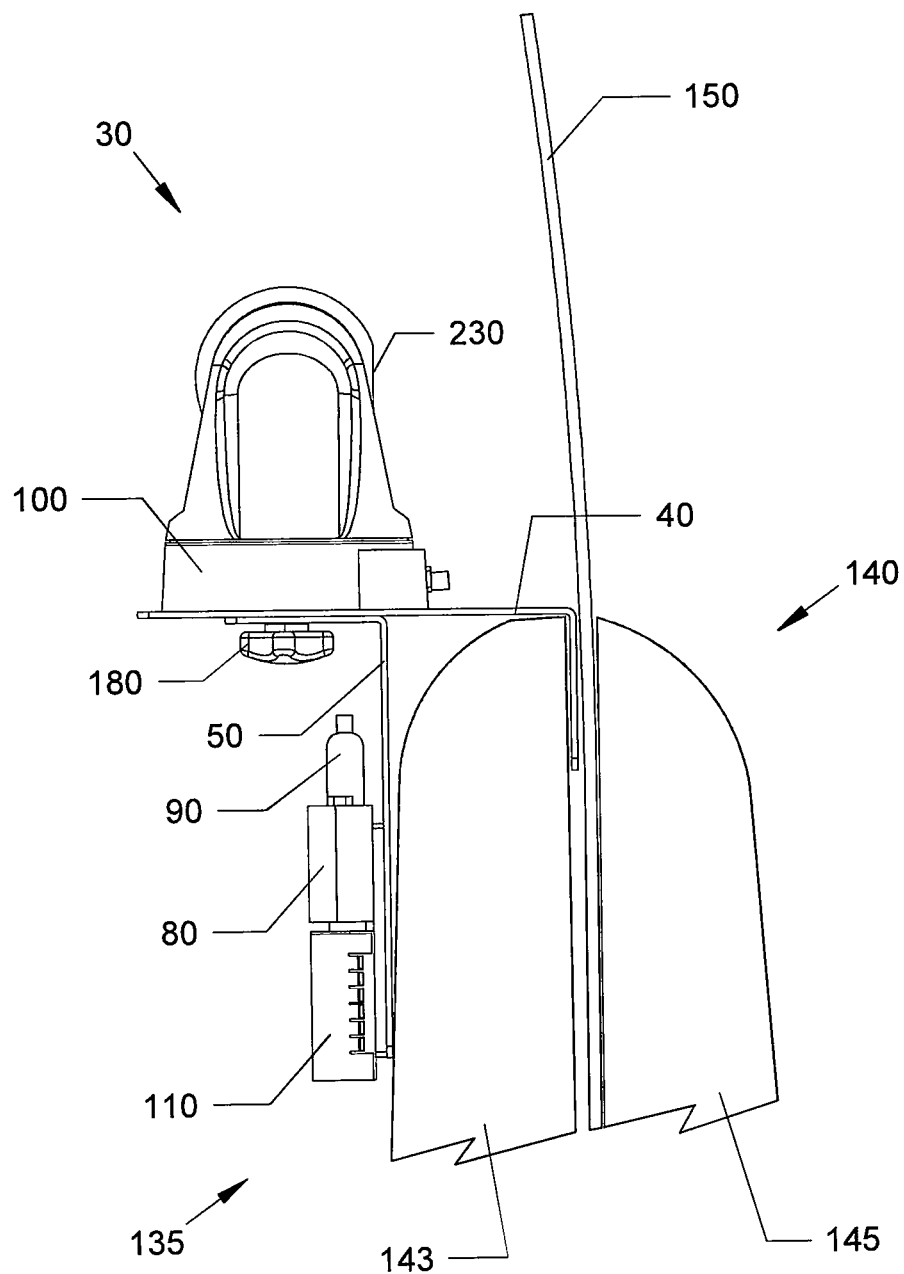

FIG. 19 is a side view of the car mounting bracket system showing the car mounting camera bracket system mounted to the inside of a car door with the camera looking out of the door window. The short leg of mounting bracket 40 is fitted into the slot between the car window and the inside door panel.

Fourth Embodiment

Figure 20:
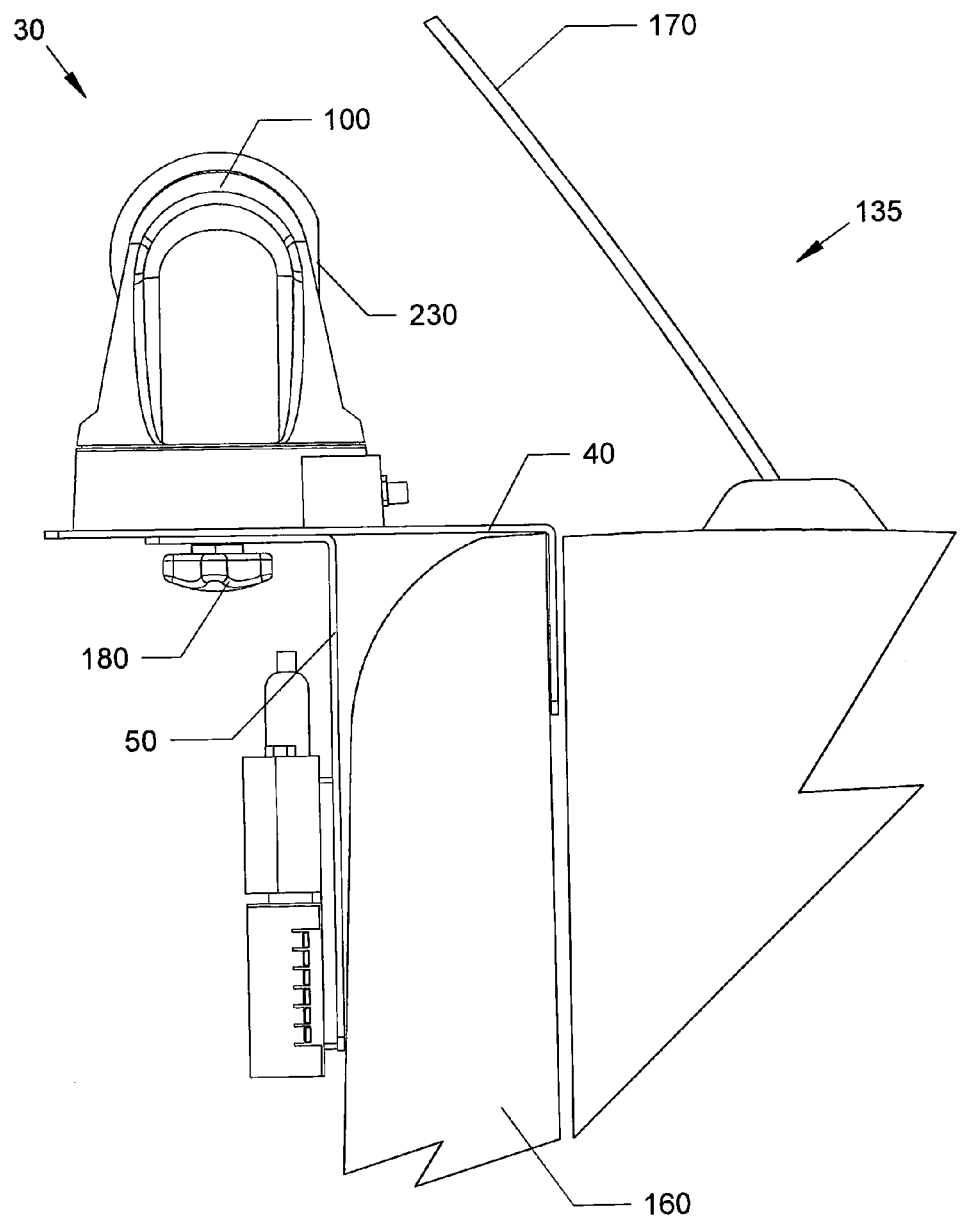

FIG. 20 is a side view of the car mounting system of FIG. 19 showing the system mounted to the seat-back of the rear bench seat with the camera looking out of the back window. The short leg of mounting bracket #1 is hooked over the top of the rear seat seat-back.

Fifth Embodiment

Figure 21:
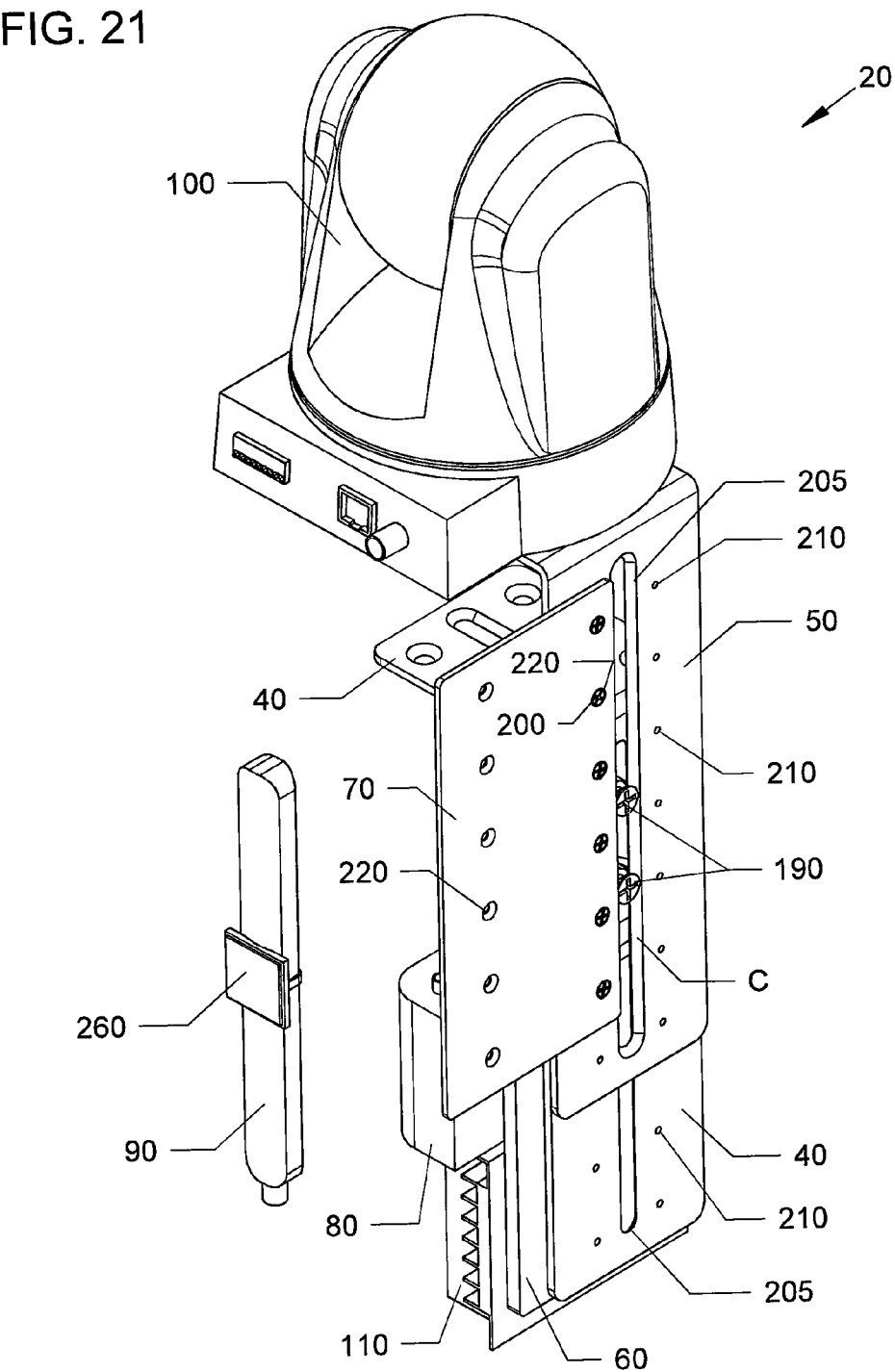

FIG. 21 is an upper rear left perspective view of a pedestal mounted embodiment of the camera bracket system.

Figure 22:
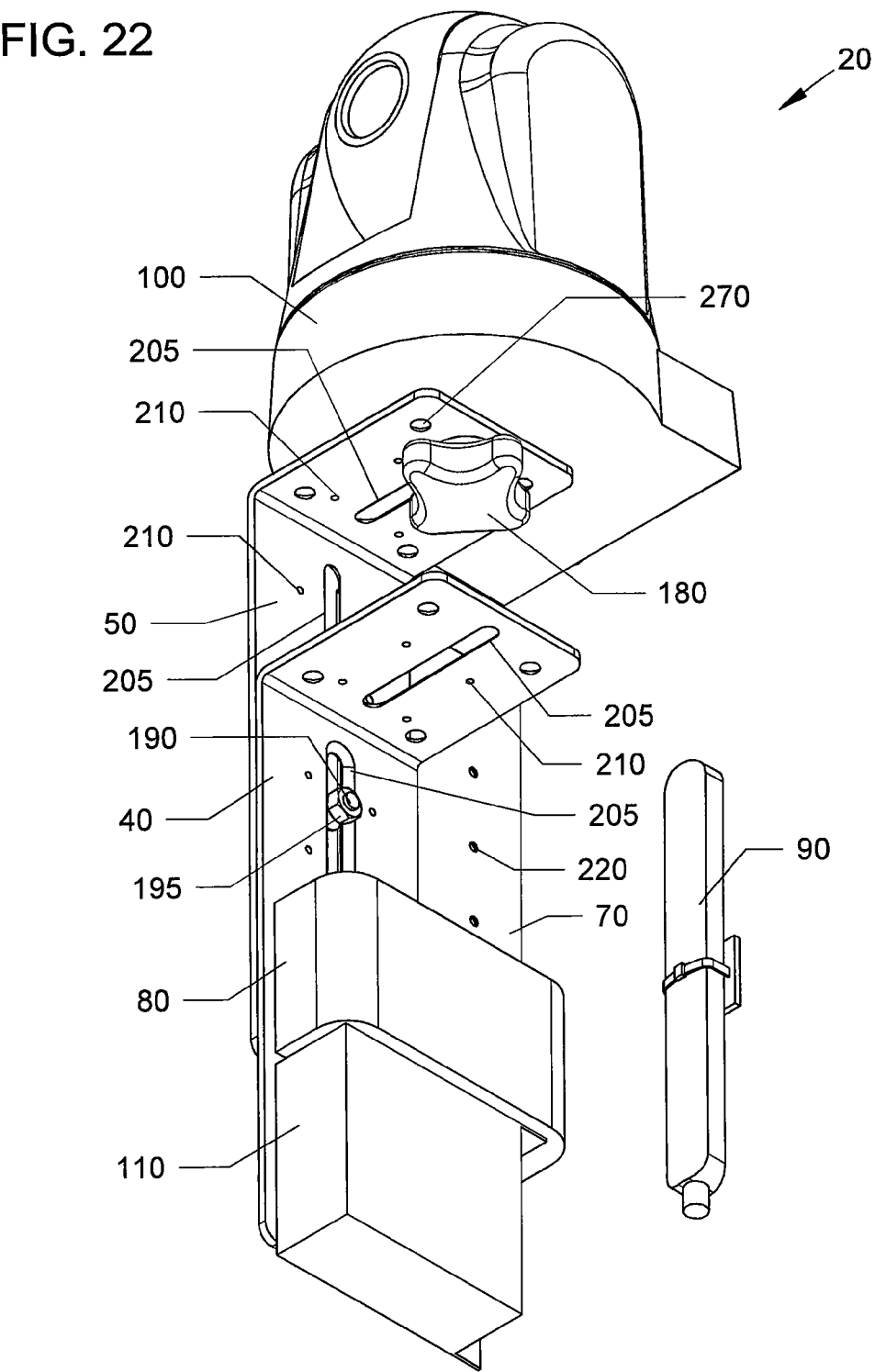

FIG. 22 is a lower front right perspective view of the pedestal mounted bracket system of FIG. 21.

FIG. 23 is a front view of the pedestal mounted bracket system of FIG. 21.

FIG. 24 is a rear view of the pedestal mounted bracket system of FIG. 21.

FIG. 25 is a right side view of the pedestal mounted bracket system of FIG. 21.

FIG. 26 is a left side view of the pedestal mounted bracket system of FIG. 21.

Figure 27:
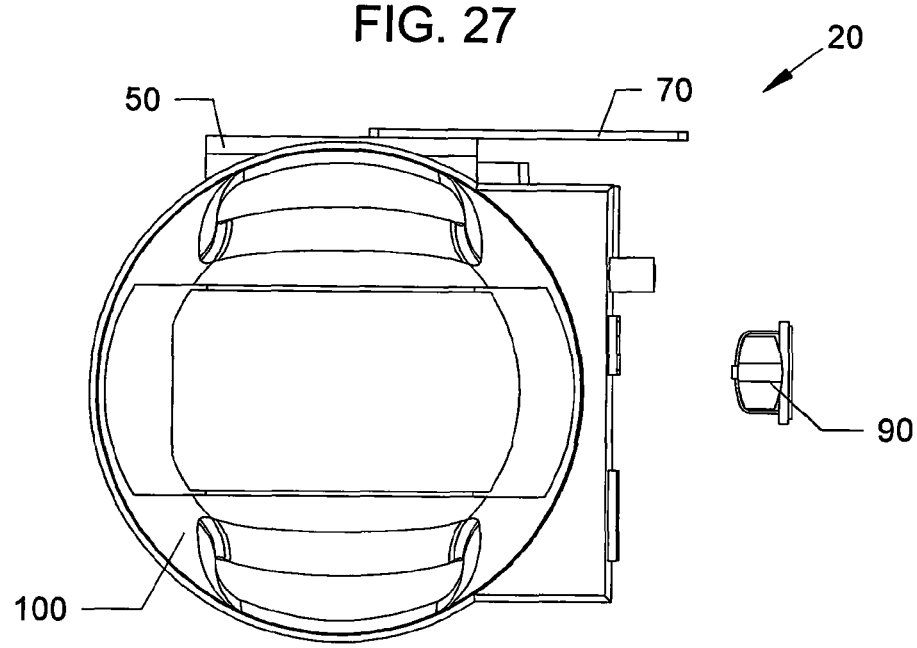

FIG. 27 is a top view of the pedestal mounted bracket system of FIG. 21.

Figure 28:
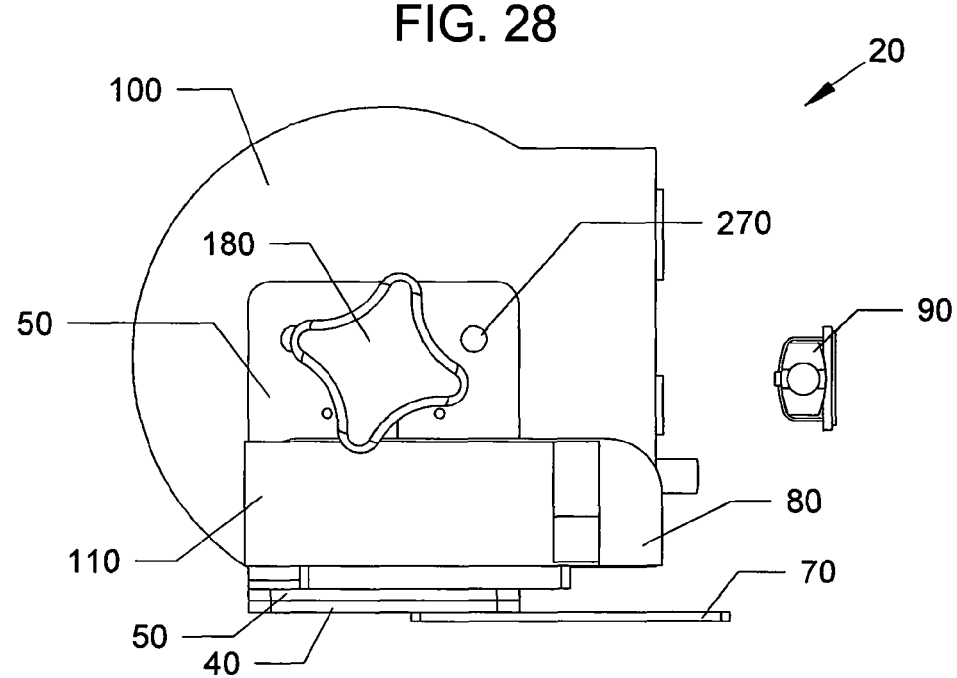

FIG. 28 is a bottom view of the pedestal mounted bracket system of FIG. 21.

FIG. 29 is a top perspective view of FIG. 21 mounted into a pedestal. The pedestal is in dash lines.

FIG. 30 is another top perspective view of the camera mounted inside the pedestal of FIG. 29 covered by the pedestal.

FIG. 31 is a top view of the first mounting bracket used in the bracket mounting systems referenced in the previous figures.

FIG. 32 is a left side view of first bracket of FIG. 31.
FIG. 33 is a front view of the first bracket of FIG. 31.
FIG. 34 is a right side view of the first bracket of FIG. 31.
FIG. 35 is a bottom view of the first bracket of FIG. 31.
FIG. 36 is a top view of the second mounting bracket used in the bracket mounting systems referenced in the previous figures.

FIG. 37 is a left side view of the second bracket of FIG. 36.
FIG. 38 is a front view of the second bracket of FIG. 36.
FIG. 39 is a right side view of second bracket of FIG. 36.
FIG. 40 is a bottom view of the second mounting bracket of FIG. 36.

Figure 41:
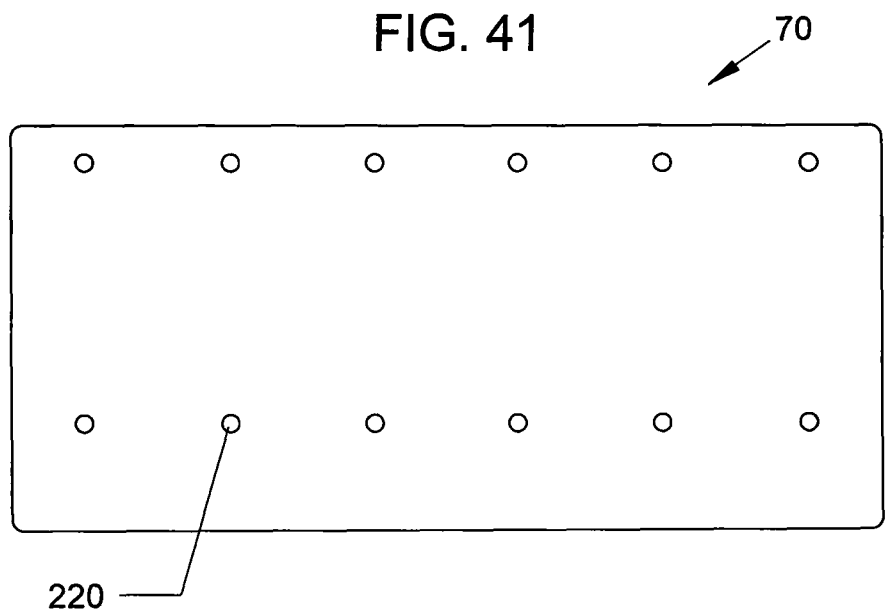

FIG. 41 is a bottom view of the cable plate used in the bracket mounting systems of the preceding figures.

Figure 42:
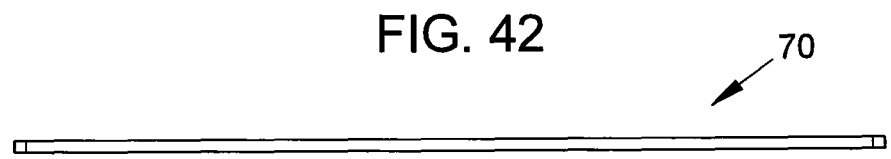
Figure 43:
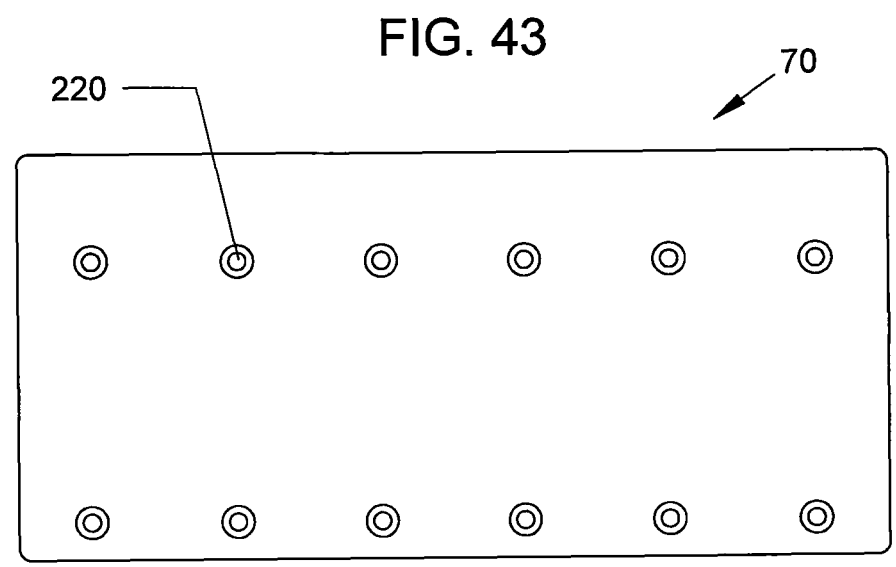
Figure 44:
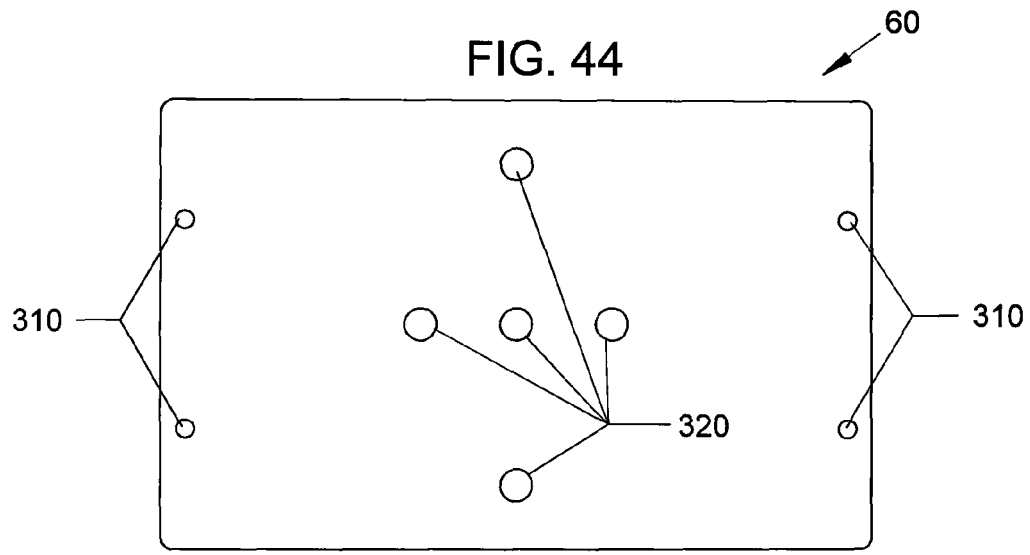

FIG. 42 is a front view of the cable plate of FIG. 41.
FIG. 43 is a top view of the cable plate of FIG. 41.
FIG. 44 is a bottom view the modem and power supply mounting plate for use in the bracket mounting systems of the preceding figures.

Figure 45:
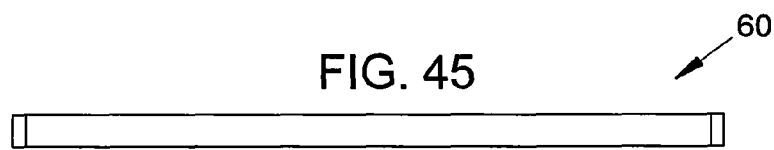

FIG. 45 is a front view of the modem and power supply mounting plate of FIG. 44.

Figure 46:
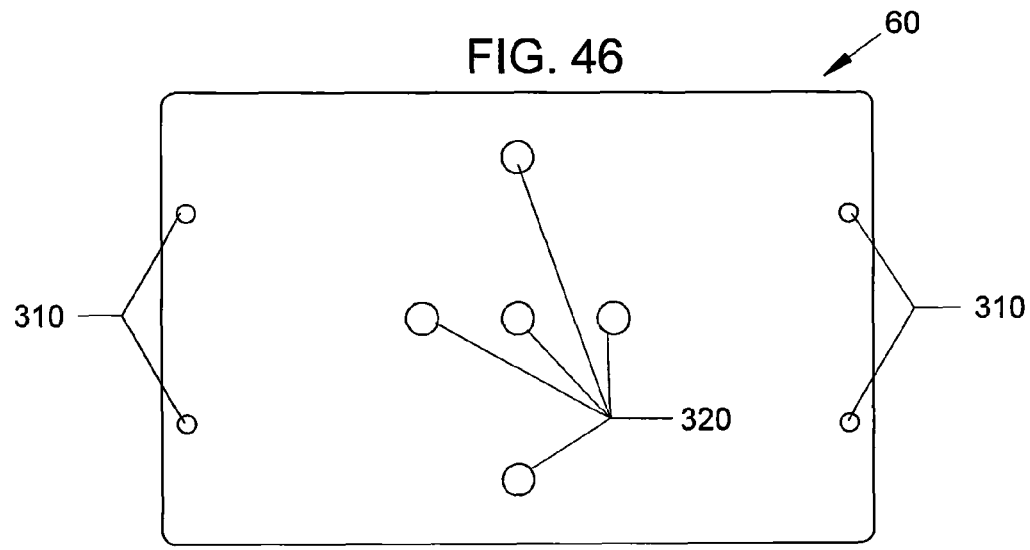

FIG. 46 is a top view of the modem and power supply mounting plate of FIG. 44.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Enclosure mount assembly/system.
20 Pedestal mount assembly/system.
30 Car mount assembly/system.
40 First Mount bracket. This bracket has the chamfer on the inside of the long slot. The location of this chamfer is the only difference between the brackets.
50 Second Mount bracket. This bracket has the chamfer on the outside of the long slot.
60 Modem and power supply mount plate.
70 Cable plate.
80 Modem (prior art).
90 Antenna (prior art).
100 Surveillance camera (prior art).
105 threaded opening in bottom of camera
105 Component mounting flat head screw.
110 Power supply (prior art).
120 Utility box (prior art).
130 Pedestal (prior art).
135 Car.
140 Car door.
143 Car door inner panel.
145 Car door outer panel.
150 Car door window sandwiched between door panels.
160 Car rear seat.
170 Car rear window.
180 Screw knob (or screw nut) to mount and adjust camera on car mount assembly.
185 threaded shaft portion
190 Bracket mounting flat head screws secure the two brackets together.
195 Bracket mounting nuts.
200 Plate mounting screws secure the plates to the brackets.

205 Slots in brackets allow for adjustment and configuration of bracket mount system. Chamfer in slots allows for flat head mounting screw recess and provides a locking surface for the bracket mounting nut.
210 Pre-threaded holes in the brackets allow for mounting of the plates.
220 Pre-drilled and counter sunk holes in the plates allow for mounting to the brackets or securing cables and wires.
230 Camera Lens.
240 Lens viewing window.
250 System wiring (shown in limited detail).
260 Cable and wiring tie down.
270 Pre-drilled and counter sunk holes in brackets for component mounting.
300 Flat head screw for mounting modem plate.
310 Pre-threaded holes in modem plate for alternate modem mount.
315 screws for pre-threaded holes
320 Pre-threaded holes in modem plate for variable orientation of plate when mounted to bracket.
330 Alternate modem.
335 mounting holes in modem
340 Alternate modem mounting screws.

First Embodiment

Figure 1:
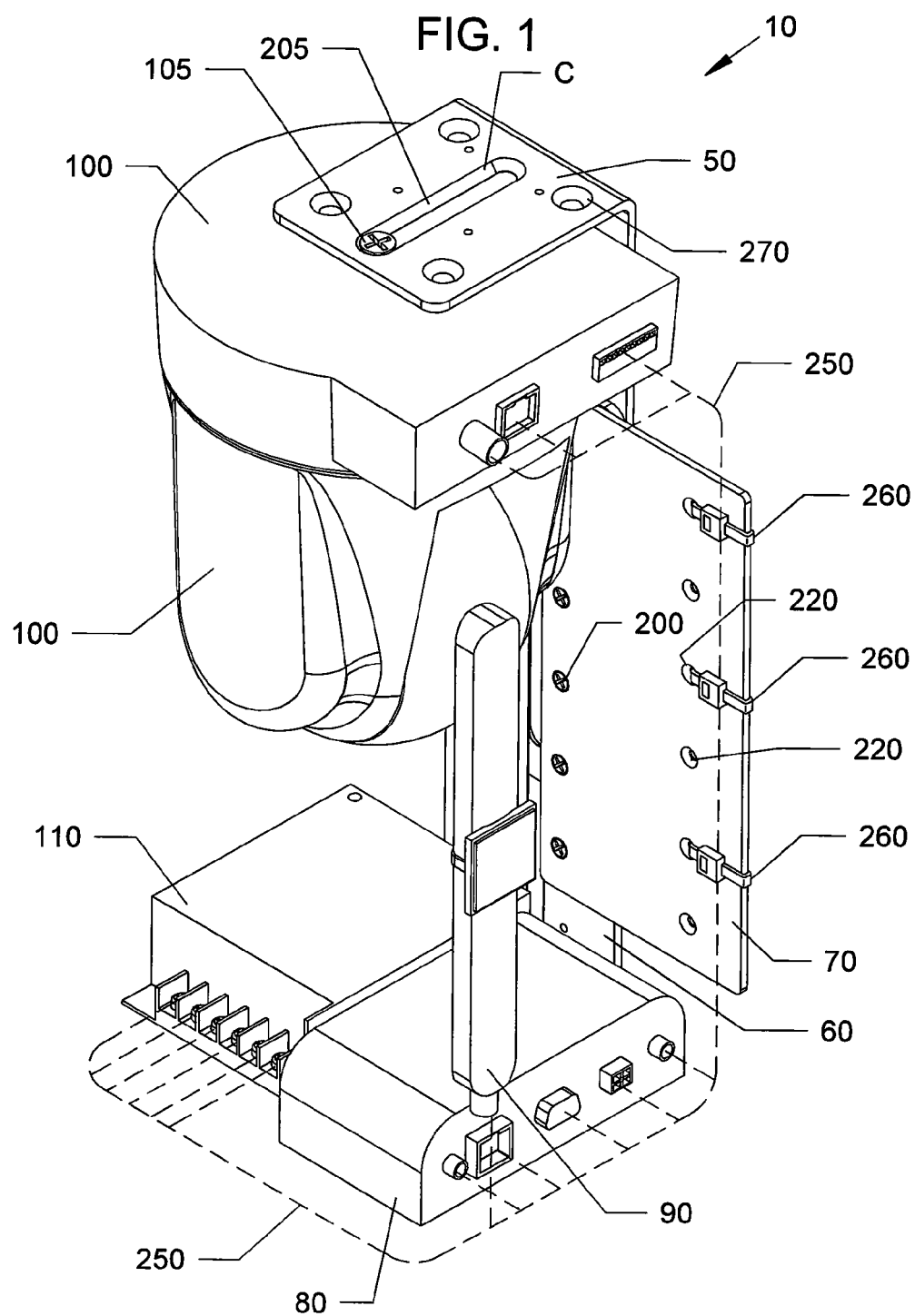
FIG. 1 is an upper rear left perspective view of a surveillance camera attached to an assembled mounting bracket forming a camera enclosure mount system.
Figure 2:
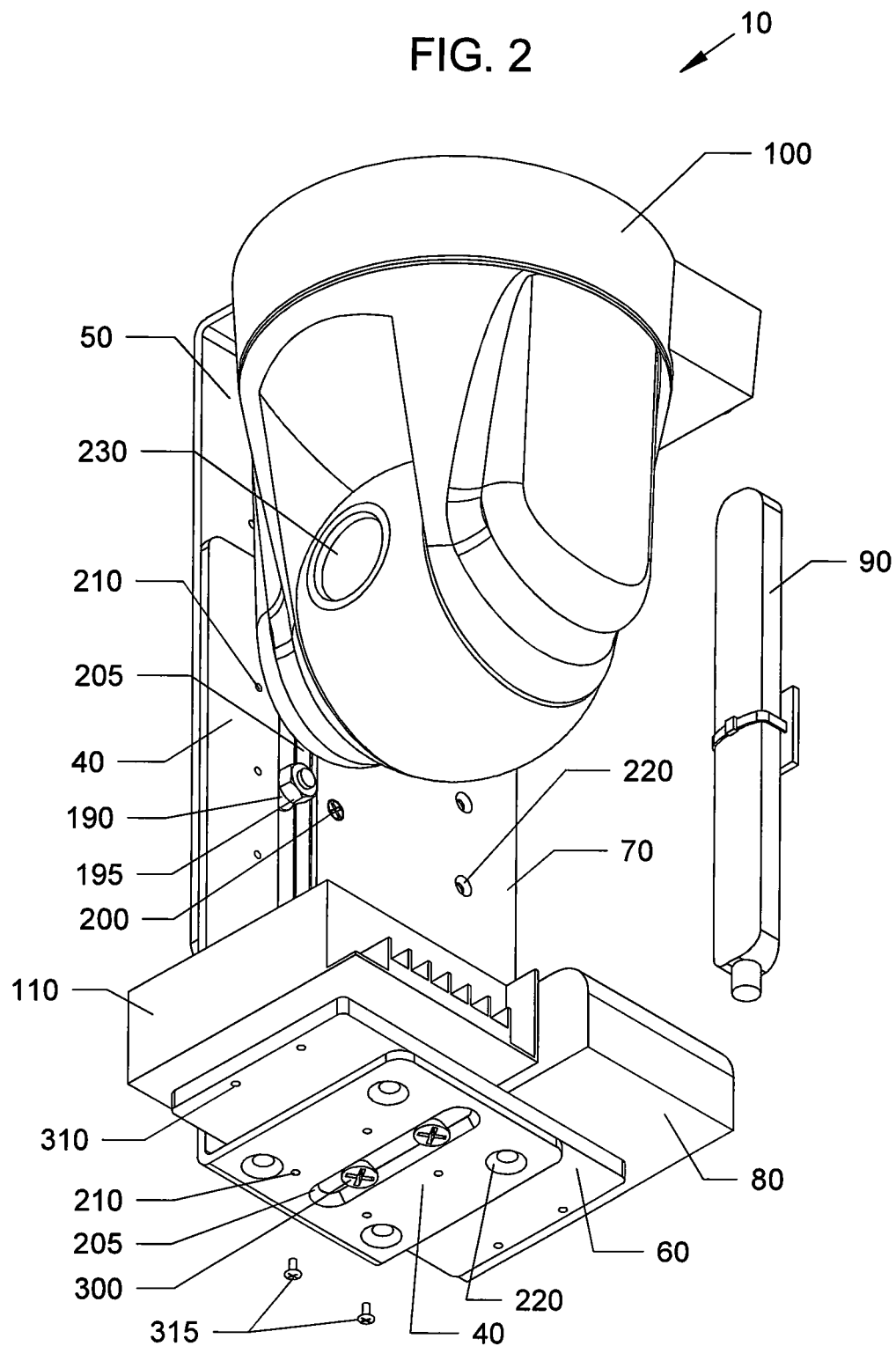
FIG. 2 is a lower front right perspective view of the camera with assembled bracket of FIG. 1.

FIG. 1 is an upper rear left perspective view of a surveillance camera 100 attached to an assembled mounting bracket forming a camera enclosure mount system 10. FIG. 2 is a lower front right perspective view of the camera 100 with assembled bracket 50 of FIG. 1.

FIG. 3 is a front view of the camera 100 with assembled bracket 50 of FIG. 1. FIG. 4 is a rear view of the camera 100 with assembled bracket 50 of FIG. 1. FIG. 5 is a right side view of the camera 100 with assembled bracket 50 of FIG. 1. FIG. 6 is a left side view of the camera 100 with assembled bracket 50 of FIG. 1. FIG. 7 is a top view of the camera 100 with assembled bracket 50 of FIG. 1. FIG. 8 is a bottom view of the camera 100 with assembled bracket 50 of FIG. 1.

Figure 10:
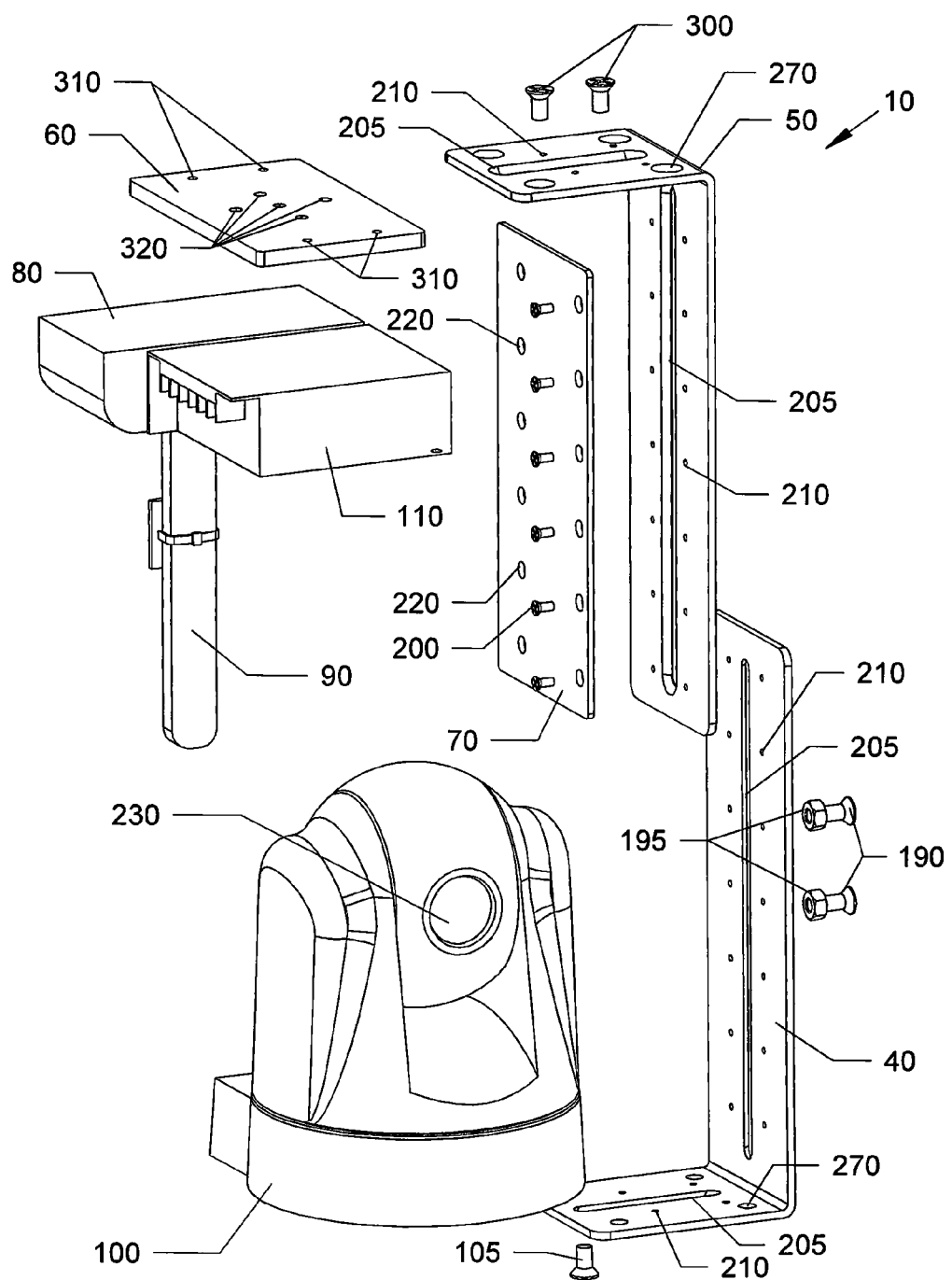
FIG. 10 is an exploded view of bracket components and camera of the enclosure mount system of FIG. 1.

FIG. 10 is an exploded view of brackets 40, 50 and other components and camera 100 of the enclosure mount system 1 of FIG. 1.

Referring to FIGS. 1-10, the mount assembly 10 can include a first mount bracket 40 having a chamfer on the inside of the long slot 205 as shown in FIG. 5. The location of this chamfer C is the only difference between the brackets 40, 50. Second mount bracket 50 has the chamfer C on the outside of the long slot 205. Bracket mounting screws 190 and nuts 195 passing through the long vertical slots 205 can secure the two brackets 40, 50 together, and allow for the brackets to be height adjustable for the camera 100 with camera lens 230 with modem 80 and antenna 90.

Predrilled holes 210 in the vertical legs of the brackets 40, 50 allow for plate 70 to be mounted to one side or another side of the vertical legs of the brackets 40, 50 by fastening mounting screws 200 into pre-drilled and countersunk holes 220 in the plate 70. System wiring 250 (shown in FIG. 1) can be secured along plate 70 by cable and wiring tie downs 260 that can pass into holes 220 and around the side edges of the plate 70.

Modem and power supply mount plate 60 can have two sets of parallel pre-threaded holes 310 for alternative modem mount position of power supply 110 and modem 80, and a cross pattern of pre-threaded holes 320 for variable orientation of the plate 60 when it is mounted to bracket 40. As shown in FIGS. 2-6 and 8, mount plate 60 can straddle on top of the short leg of bracket 40 and held in place by passing flat head screws 300 into the bottom chamfered portion of slot 205 and into a pair of pre-drilled slots 320 in plate 60. Assembled mounting plate 60 allows for modem 80 and power supply 110 to sit on top of the mounting plate 60. Additional holes in these components can also allow for modem 80 and power supply 100 to be fastened to the mounting plate pre-threaded holes 310 in plate 60 by additional screw fasteners 315.

The base of camera 100 can be attached to the lower portion of the short horizontal leg of bracket 50 by component mounting flat head screws 205 that can pass into a chamfered portion C of slot 205 an into mateable openings (not shown) in the base of the camera 100.

The antenna 90 typically mounts directly to the wireless modem by way of a male connector on the antenna and a female connector on the modem. In the event the antenna must be moved a coax cable with connectors will provide that ability. The antenna can be mounted on a cable management plate with tie wraps holding it in place. The antenna can also mount on the wall of the enclosure with an adhesive tie base and tie wrap(s).

Figure 9:
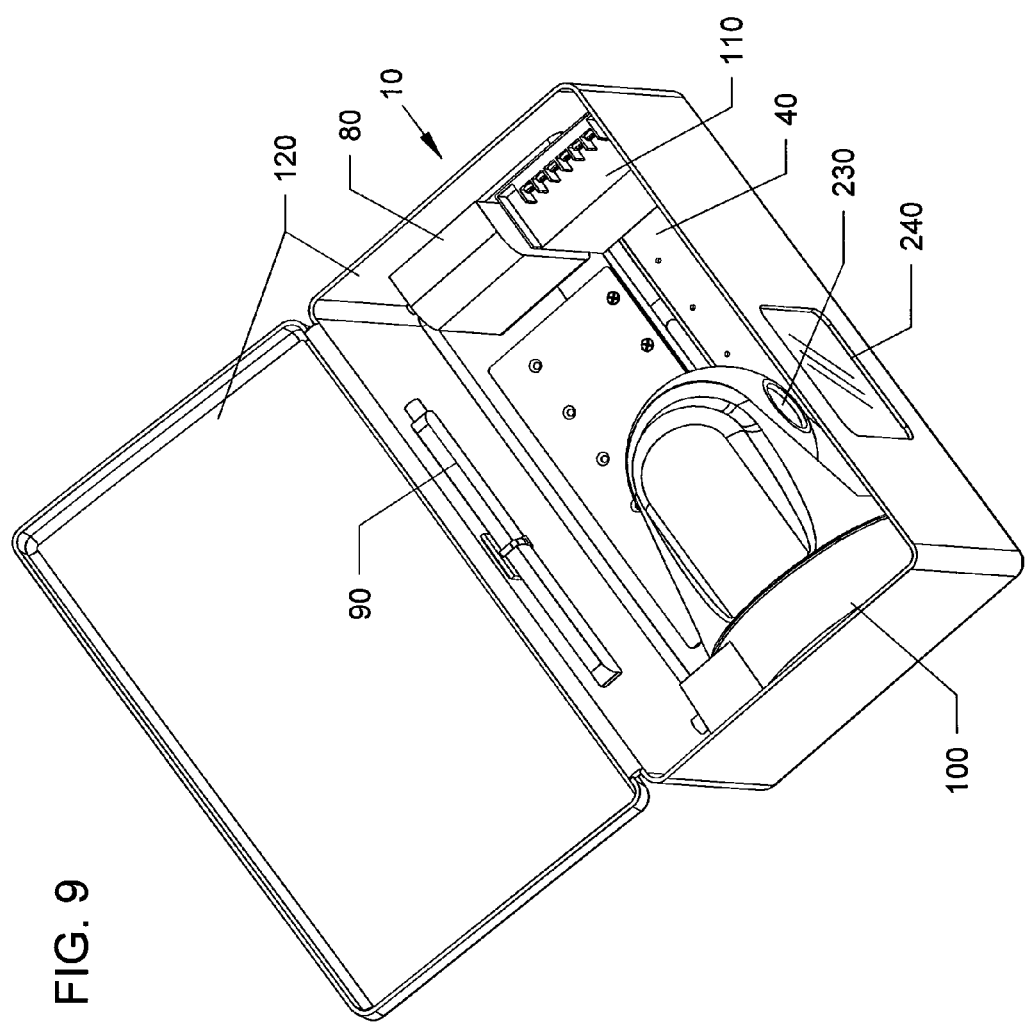
FIG. 9 is perspective view of the enclosure mount system of FIG. 1 mounted into a standard utility box.

FIG. 9 is perspective view of the enclosure mount system 10 of FIG. 1 mounted into a standard utility box 120. The camera 100 with lens 230 and the rest of the mount assembly/system 10 is configured to mount in an electrical utility box 120 with windows 240 on the sides and front. The brackets 40, 50 can be adjusted higher or lower as required for the specific enclosure. The brackets 40, 50 provide a means to easily mount the required equipment and install or remove as a single unit in the electrical utility box 120.

Second Embodiment-Vehicle Mounting Bracket

FIG. 11 is a lower front right perspective view of the vehicle mounting bracket assembly 30 for a surveillance camera 100 with camera lens 230. FIGS. 12A, 12B, and 12C are upper rear left perspective views of the vehicle mounting bracket assembly 30 for a surveillance camera 100 FIG. 11. FIG. 12D is an exploded view of the mounting bracket assembly 30 of FIGS. 12A-12C.

FIG. 13 is a front view of the vehicle mounting bracket assembly 30 for a camera 100 of FIG. 11. FIG. 14 is a rear view of the vehicle mounting bracket assembly 30 for a camera 100 of FIG. 11. FIG. 15 is a right side view of the vehicle mounting bracket assembly 100 for a camera 100 of FIG. 11. FIG. 16 is a left side view of the vehicle mounting bracket assembly 30 for a camera 100 of FIG. 11. FIG. 17 is a top view of the vehicle mounting bracket assembly 30 for a camera 100 of FIG. 11. FIG. 18 is a bottom view of the vehicle mounting bracket assembly 30 for a camera 100 of FIG. 11.

Referring to FIGS. 11-18, the vehicle bracket assembly 30 uses the first mount bracket 40 and second mount bracket 50 described in the previous embodiment. First bracket 40 is oriented so that the long leg is generally horizontal and the short leg portion facing downward. Second bracket 50 is positioned so that the short leg is placed adjacent a lower surface portion of the long leg of bracket 40, with the long leg of bracket 50 aimed downward.

A turn knob 180 with an upper protruding threaded shaft portion 185 (see FIG. 13) that can be passed through slot 205 in the lower surface of the short leg of bracket 50, and through slot 205 of the long leg of bracket 40 The bottom of the camera 100 can have a threaded opening 105 for receiving the threaded shaft portion 185 of the turn knob 180. Loosening (unscrewing) knob 180 allows for the camera 100 to slide back and forth to a desired position above the long leg of bracket 40.

Referring to FIGS. 11 and 13-18, modem 80 and power supply 110 can be mounted to a front face of long leg of bracket 50, and can be mounted by screws 315 (shown in FIG. 2) passing through a rear side of long leg of bracket 50 and into threaded openings on the bottom of modem 80 and power supply 110. Antenna 90 can be attached to a side of mounted modem 80 and power supply 110 by a tie down 260 that can pass through a side opening(s) (not shown) in these components.

As shown in FIG. 12D, modem and power supply mount plate 60 can be placed along a front side of the long leg of bracket 50, and screws 300 can pass through chamfered portion of slot 205 on the rear side of the long leg and into a pair of pre-threaded holes 320 in plate 60. An alternative modem 330 can be mounted to a front side of the plate 60 by threading screws 340 through mounting holes 335 of the modem 330 into pre-threaded holes 310 on the front side of plate 60.

FIG. 12A shows alternate modem 330 with mount plate 60 amounted to a front side of the long leg of bracket 50 in a vertical orientation by screws 300 passing through chamfered portion C of slot 205 and threaded into a vertical pair of pre-threaded holes 320.

FIG. 12B shows alternate modem 330 being mounted at a tilt adjustable position(s) by a single screw 300 passing through chamfered portion C of slot 205 of the long leg of bracket 50 and threaded into a single pre-threaded hole 320 in plate 60.

FIG. 12C shows alternate modem 330 with plate 60 being mounted at a horizontal orientation position by a pair of screws 300 passing through chamfered portion C of slot 205 of the long leg of bracket 50 and threaded into pre-threaded holes 320 in plate 60.

The bracket system 30 depicted in FIGS. 11-18 can be configured and adjusted accordingly with the brackets 40, 50 slid back and forth for a vehicle installation. Referring to FIGS. 15-16, the vertical areas of the brackets 40, 50 serve to mount on a vehicle door panel or on a seat backrest by adjusting the gap space (G) between the rear of vertically oriented long leg of bracket 50 and the vertically oriented short leg of bracket 40.

To install the camera bracket assembly 30 loosen turn knob 180 mounted in bottom of the camera 100 through horizontal short leg of bracket 50. The two vertical areas of the brackets 40, 50 are squeezed against the door panel or seat backrest and the thumb knob 180 tightened. The bracket assembly 30 serves to mount the camera 100, and associated electronic equipment and serves as the entire system mounting platform. The ease of installation, removal and portability are key advantages of the bracket system.

Third Embodiment-Inside of Vehicle Door

FIG. 19 is a side view of the car mounting bracket system 30 showing the car mounting camera bracket system 30 mounted to the inner panel 143 of a car door 140 with the camera 100 with lens 230 looking out of the door window 150. The short leg of mounting bracket 40 can be fitted into the slot between the car window 150 with the car door outer panel 145, and the inside door panel 143.

The bracket system 140 in FIG. 19 depicts a simple camera mount system 30 that slips into place. It is secured by squeezing the two vertical areas of the loosely attached brackets 40, 50 against both sides of the inner door panel 143, then tightening the turn knob 180 to secure the bracket. The bracket assembly 30 provides a platform to mount the camera 100 and associated electronic equipment as a single unit. Simplicity of the installation, adaptability to install in any vehicle 135 and portability are key advantages of the system.

Fourth Embodiment-Mounted to Rear Bench Seat

FIG. 20 is a side view of the car mounting system 30 of FIG. 19 showing the system 30 mounted to the seat-back 160 of the rear bench seat with the camera 100 with lens 230 looking out of the rear back window 170. The short leg of mounting bracket 40 is hooked over the top of the rear seat seat-back 160.

The bracket in FIG. 20 depicts the same camera 100 and bracket system 30 of the preceding embodiments installed in FIG. 19, however it is installed on the backrest 160 of a vehicle seat. The camera bracket system 30 can be secured by squeezing the initially loosely positioned two vertical areas of the brackets 40, 50 against the vehicle seat backrest 160, then tightening the turn knob 180 to secure the camera 100 and brackets 40, 50. The bracket assembly 30 provides a platform to mount the camera 100 and associated electronic equipment. Simplicity of the installation, adaptability to install in any vehicle 135, and portability are key advantages of the system.

Fifth Embodiment-Pedestal Mount

FIG. 21 is an upper rear left perspective view of a pedestal mounted assembly 20 embodiment of the camera bracket system. FIG. 22 is a lower front right perspective view of the pedestal mounted bracket system 20 of FIG. 21.

FIG. 23 is a front view of the pedestal mounted bracket system 20 of FIG. 21. FIG. 24 is a rear view of the pedestal mounted bracket system 20 of FIG. 21. FIG. 25 is a right side view of the pedestal mounted bracket system 20 of FIG. 21. FIG. 26 is a left side view of the pedestal mounted bracket system 20 of FIG. 21. FIG. 27 is a top view of the pedestal mounted bracket system 20 of FIG. 21. FIG. 28 is a bottom view of the pedestal mounted bracket system 20 of FIG. 21.

Referring to FIGS. 23-28, brackets 40, 50 can be attached to one another by having each bracket 40, 50 oriented with the long legs in a vertical orientation sandwiched together with the horizontal short leg of bracket 50 spaced above the horizontal short leg of bracket 40 so that turn knob 180 is accessible. Screws 190 passing through chamfered portion C of slot 205 of long leg of bracket 50 can attach to long leg of bracket 40 with nuts 195 on the opposite side of the screws 190.

Loosening the turn knob 180 allows for sliding camera 100 along slot 205 in horizontal short leg of bracket 50 to a desired position where the turn knob 180 is tightened down.

Modem 80 and power supply 110 can be mounted to plate 60 and to a lower portion of long leg of bracket 40 using screws for attachment as described in the previous embodiments above. Antenna 90 can also be mounted to the assembly 20 at desired locations using tie downs 260 as needed.

Cable plate 70 can be mounted to a rear surface of long leg of bracket 50 by plate mounting screws 200 passing through pre-drilled and counter sunk holes 220 which can then threadably attach into pre-threaded holes 210 in long leg of bracket 50. Cable plate 70 can be used to attach system wiring 250 (shown in FIG. 1) with ties 260 as needed, and or attach antenna 90 in place.

FIG. 29 is a top perspective view of the pedestal mount assembly 20 of FIG. 21 mounted into a pedestal 130. The pedestal 130 with window 240 in the pedestal 130 is in dashed lines. FIG. 30 is another top perspective view of the camera mounted inside the pedestal of FIG. 29 covered by the pedestal.

The bracket system 20 depicted in FIGS. 21-29 is configured for an installation in a vertical pedestal 130. The brackets 40, 50 can be configured to provide maximum camera 100 vertical adjustment for proper camera viewing of lens 230 through the pedestal window 240. The sandwiched vertical long legs of brackets 40, 50 can be mounted to an inner wall inside pedestal 130 by screws 220 passing through holes 210 and/or be additional screws 190 shown in previous embodiments passing through slots 205 into the inner side walls of the pedestal 130. The pedestal bracket assembly 20 configuration also allows for maximum mounting space for associated electronic equipment. Simplicity of the installation and adjustability to conform to various dimension for associated electronic equipment are key benefits for this configuration.

First Bracket

FIG. 31 is a top view of the first mounting bracket 40 used in the bracket mounting systems 10, 20, 30 referenced in the previous figures. FIG. 32 is a left side view of first bracket 40 of FIG. 31. FIG. 33 is a front view of the first bracket 40 of FIG. 31. FIG. 34 is a right side view of the first bracket 40 of FIG. 31. FIG. 35 is a bottom view of the first bracket 40 of FIG. 31.

Second Bracket

FIG. 36 is a top view of the second mounting bracket 50 used in the bracket mounting systems referenced in the previous figures. FIG. 37 is a left side view of the second bracket 50 of FIG. 36 FIG. 38 is a front view of the second bracket 50 of FIG. 36. FIG. 39 is a right side view of second bracket 50 of FIG. 36. FIG. 40 is a bottom view of the second mounting bracket 50 of FIG. 36.

Cable Plate

FIG. 41 is a bottom view of the cable plate 70 used in the bracket mounting systems of the preceding figures. FIG. 42 is a front view of the cable plate 70 of FIG. 41. FIG. 43 is a top view of the cable plate of FIG. 41.

Modem and Power Supply Mounting Bracket

FIG. 44 is a bottom view the modem and power supply mounting plate 60 for use in the bracket mounting systems of the preceding figures. FIG. 45 is a front view of the modem and power supply mounting plate 60 of FIG. 44. FIG. 46 is a top view of the modem and power supply mounting plate of FIG. 44.

The bracket systems described in the previous embodiments can be sold in kits, where one kit can be used to mount surveillance cameras in different applications. A kit can include two L shaped brackets 40, 50, fasteners, such as screws or bolts, a modem and power supply plate 60, and a cable plate 70.

The bracket systems can include bracket parts formed from metal, such as but not limited to metal, galvanized metal, aluminum, steel, stainless steel, and the like, and combinations thereof. Metal bracket components can be powder coated, and/or finished with a black oxide finis, and/or finished with a black powder coatings. Other colors, can be used as needed.

Alternatively rigid or semi-rigid plastic can be used for the bracket components, such as for the L shaped brackets and plates, along with metal fasteners as needed.

The invention allows for quick assembly of video surveillance components in a single frame. Cameras and associated components can be easily installed into an enclosure box, pedestal or auto or any type of vehicle, and be ready to be used for surveillance.

The novel bracket assemblies/systems 10, 20, 30 can be adjustable for approximately 10" to approximately 17" tall enclosure boxes and pedestal props.

The novel bracket assemblies/systems 10, 20, 30 can be configured and easily used by the do it yourself tech who does installations and repairs on poles, builds their own camera props, needs quick assembly, and only requires a screw driver, such as a single Philips screw driver for assembly.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A camera bracket mounting system comprising:

a first L shaped bracket having a first flat plate with a first end and a second end and a longitudinal through-hole slot in the first plate between the first end and the second end, with a first plate length between the first end and the second end, a plurality of threaded holes on both sides of the longitudinal through-hole slot in the first plate, and a second flat plate with a first end and a second end, the first end of the second flat plate extending perpendicular from the second end of the first plate, with a longitudinal through-hole slot between the first end and the second end of the second flat plate, with a second plate length between the first end and the second end, a plurality of threaded holes on both sides of the longitudinal through-hole slot in the second plate, the first plate length between being more than twice as long as the second flat plate length;

a second L shaped bracket having a first flat plate with a first end and a second end and a longitudinal through-hole slot in the first plate between the first end and the second end, with a first plate length between the first end and the second end, a plurality of threaded holes on both sides of the longitudinal through-hole slot in the first plate, and a second flat plate with a first end and a second end, the first end of the second flat plate extending perpendicular from the second end of the first plate, with a longitudinal through-hole slot between the first end and the second end of the second flat plate, with a second plate length between the first end and the second end, a plurality of threaded holes on both sides of the longitudinal through-hole slot in the second plate, the first plate length being more than twice as long as the second flat plate length;

a first fastener for mounting sandwiched portions of the first L shaped bracket to the second L shaped bracket by fastening the first fastener through adjacent longitudinal through-hole slots of the first L shaped bracket and the second L shaped bracket; and a second fastener adapted for attaching a surveillance camera to at least one of the first L shaped bracket and the second L shaped bracket.

2. The camera bracket mounting system of claim 1, wherein the first flat plate of the first L shaped bracket and the first flat plate of the second L shaped bracket overlap one another so that the longitudinal through-hole slot in the first flat plate of the first L shaped bracket and the first flat plate of the second L shaped bracket overlap one another and are attached to one another by the first fastener, and form an enclosure so that the camera is mounted by the second fastener to one of the second flat plates, and the camera is located between the respective perpendicular second flat plates of the first and the second L shaped brackets.

3. The camera bracket mounting system of claim 2, further comprising:
a modem and power supply mount plate adapted for mounting at least one of a camera modem and a camera power supply to the bracket mounting system.

4. The camera bracket mounting system of claim 3, further comprising:
a cable plate attached to at least one of the first L shaped bracket and the second L shaped bracket.

5. The camera bracket mounting system of claim 1, further comprising:
a knob with threaded shaft as the first fastener adapted for passing through the longitudinal through-hole slot of the second plate of the first L shaped bracket, and through the longitudinal through-hole slot of the first plate of the second L shaped bracket.

6. The camera bracket mounting system of claim 1, wherein the first plate of the first L shaped bracket is oriented in a horizontal direction with the second plate of the first L shaped bracketed oriented downward, and the second plate of the second L shaped bracket is oriented in a horizontal direction parallel to and adjacent to the first plate of the L shaped bracket, and attached to one another by the first fastener.

7. The camera bracket mounting system of claim 6, further comprising:
a modem and power supply mounting plate adapted for mounting a modem and power supply through the longitudinal through-hole of the first plate of the second L shaped bracket.

8. The camera bracket mounting system of claim 6, wherein the first L shaped bracket and the second L shaped bracket are adapted to be mounted to a vehicle door panel adjacent to a vehicle window.

9. The camera bracket mounting system of claim 6, wherein the first L shaped bracket and the second L shaped bracket are adapted to be mounted to an upper edge of a vehicle seat.

10. The camera bracket mounting system of claim 1, wherein the first plate of the first L shaped bracket is oriented in a vertical direction with the second plate of the first L shaped bracketed oriented in a horizontal direction, and the first plate of the second L shaped bracket is oriented in a vertical direction with the second plate of the second L shaped bracket oriented in a horizontal direction, and the first plate of the first L shaped bracket attached to the first plate of the second L shaped bracket by the first fastener, with the second plate of the first L shaped bracket and the second plate of the second L shaped bracket parallel to one another, adapted for the camera to be mounted to one of the second plates of the first L shaped bracket and the second L shaped bracket.

11. The camera bracket mounting system of claim 10, further comprising:
a modem and power supply mounting plate adapted for mounting a modem and power supply through the longitudinal through-hole of at least one of the first plate of the first L shaped bracket or the first plate of the second L shaped bracket.

12. A surveillance camera bracket mounting kit, comprising:
a first L shaped bracket having a first flat plate with a first end and a second end and a longitudinal through-hole slot in the first plate between the first end and the second end, a first plate length between the first end and the second end, a plurality of threaded holes on both sides of the longitudinal through-hole slot in the first plate, and a second flat plate with a first end and a second end, the first end of the second flat plate extending perpendicular from the second end of the first plate, with a longitudinal through-hole slot between the first end and the second end of the second flat plate, a second plate length between the first end and the second end, a plurality of threaded holes on both sides of the longitudinal through-hole slot in the second plate, the first plate being at least twice as long as the second flat plate length;
a second L shaped bracket having a first flat plate with a first end and a second end and a longitudinal through-hole slot in the first plate between the first end and the second end, a first plate length between the first end and the second end, a plurality of threaded holes on both sides of the longitudinal through-hole slot in the first plate, and a second flat plate with a first end and a second end, the first end of the second flat plate extending perpendicular from the second end of the first plate, with a longitudinal through-hole slot between the first end and the second end of the second flat plate, a second plate length between the first end and the second end, a plurality of threaded holes on both sides of the longitudinal through-hole slot in the second plate, the first plate length being at least twice as long as the second flat plate length;
a first fastener for mounting sandwiched portions of the first L shaped bracket to the second L shaped bracket by fastening the first fastener through adjacent longitudinal through-hole slots of the first L shaped bracket and the second L shaped bracket;
a surveillance camera; and
a second fastener adapted for attaching the surveillance camera to at least one of the first L shaped bracket and the second L shaped bracket.

13. The surveillance camera bracket mounting kit of claim 12, further comprising:
a box for holding the first L shaped bracket, the second L shaped bracket,
the first fastener, the second fastener and the surveillance camera.

14. The surveillance camera bracket mounting kit of claim 12, further comprising:
a modem and power supply mount plate adapted for mounting at least one of a camera modem and a camera power supply to at least one of the first L shaped bracket and the second L shaped bracket.

15. The surveillance camera bracket mounting kit of claim 12, further comprising:
a cable plate adapted to be attached to at least one of the first L shaped bracket and the second L shaped bracket.

16. The surveillance camera bracket mounting kit of claim 12, further comprising:
a knob with threaded shaft as the first fastener adapted for passing through the longitudinal through-hole slot of the second plate of the first L shaped bracket, and through the longitudinal through-hole slot of the first plate of the second L shaped bracket.

17. A method of mounting surveillance camera with universally attachable brackets, comprising the steps of:
providing a first L shaped bracket having a first flat plate with a first end and a second end and a longitudinal through-hole slot in the first plate between the first end and the second end, a plurality of threaded holes on both sides of the longitudinal through-hole slot in the first plate, and a second flat plate with a first end and a second end, the first end of the second flat plate extending perpendicular from the second end of the first plate, with a longitudinal through-hole slot between the first end and the second end of the second flat plate, a plurality of threaded holes on both sides of the longitudinal through-hole slot in the second plate, the first plate being at least twice as long as the second flat plate;

providing a second L shaped bracket having a first flat plate with a first end and a second end and a longitudinal through-hole slot in the first plate between the first end and the second end, a plurality of threaded holes on both sides of the longitudinal through-hole slot in the first plate and a second flat plate with a first end and a second end, the first end of the second flat plate extending perpendicular from the second end of the first plate, with a longitudinal through-hole slot between the first end and the second end of the second flat plate, a plurality of threaded holes on both sides of the longitudinal through-hole slot in the second plate, the first plate being at least twice as long as the second flat plate;

providing a first fastener;

attaching sandwiched portions of the first L shaped bracket to the second L shaped bracket together into a plurality of different configurations, by fastening the first fastener through adjacent longitudinal through-hole slots of the first L shaped bracket and the second L shaped bracket;

providing a second fastener; and attaching a surveillance camera to at least one of the first L shaped bracket and the second L shaped bracket by the second fastener.

18. The camera bracket mounting system of claim 1, wherein the longitudinal through-hole slot in the first plate of the first L shaped bracket has a chamfer edge on a inside surface of the first plate, and the longitudinal through-hole slot in the second plate of the second L shaped bracket has a chamfer edge on an outside surface of the first plate.

19. The surveillance camera bracket mounting kit of claim 12, wherein the longitudinal through-hole slot in the first plate of the first L shaped bracket has a chamfer edge on a inside surface of the first plate, and the longitudinal through-hole slot in the second plate of the second L shaped bracket has a chamfer edge on an outside surface of the first plate.

20. The method of claim 17, further comprising the step of:

providing the longitudinal through-hole slot in the first plate of the first L shaped bracket has a chamfer edge on a inside surface of the first plate, and providing the longitudinal through-hole slot in the second plate of the second L shaped bracket has a chamfer edge on an outside surface of the first plate.

* * * * *